United States Patent
Engstrom et al.

(10) Patent No.: US 6,463,078 B1
(45) Date of Patent: Oct. 8, 2002

(54) METHOD FOR SWITCHING PROTOCOLS TRANSPARENTLY IN MULTI-USER APPLICATIONS

(75) Inventors: G. Eric Engstrom, Kirkland; Craig G. Eisler, Redmond, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/128,676

(22) Filed: Jul. 22, 1998

(51) Int. Cl.$^7$ .................................................. H04J 3/16
(52) U.S. Cl. ........................ 370/466; 370/475; 709/203
(58) Field of Search ................................. 370/466, 464, 370/465, 467, 469, 475, 471, 351, 352, 353, 360, 389, 395, 409; 709/203, 204, 227, 228, 229, 230; 463/41, 42, 43

(56) References Cited

U.S. PATENT DOCUMENTS

| | | | |
|---|---|---|---|
| 4,996,685 A | 2/1991 | Farese et al. | 370/352 |
| 5,157,662 A | 10/1992 | Tadamura et al. | 370/352 |
| 5,610,910 A | 3/1997 | Foscaneanu et al. | 370/351 |
| 5,659,685 A | 8/1997 | Williams et al. | 709/220 |

FOREIGN PATENT DOCUMENTS

| | | |
|---|---|---|
| EP | 0632625 A1 | 1/1995 |
| EP | 0714684 A1 | 6/1996 |
| EP | 0797337 A2 | 9/1997 |
| EP | 0814589 A2 | 12/1997 |

OTHER PUBLICATIONS

Microsoft DirectPlay™ 3.0, Service Provider Development Kit, pp. 1–40 (At least as early as Jul. 22, 1998).
Microsoft DirectPlay™ Lobby, Application Programming Interface, pp. 1–27 (At least as early as Jul. 22, 1998).
Microsoft DirectPlay™ Application Programming Interface Specification (At least as early as Jul. 22, 1998).
Kali95, web pages, downloaded from Internet in Jun. 1997.
Robar, Jason, Programming for the Windows 95 Game SDK, pp. 1–4, Jul. 13, 1995, from MSDN™ Library—Apr. 1998.
McCulley, Mark, Mapping Microsoft'Game, Interactive Media Technologies, pp. 1–4, from MSDN™ Library—Apr. 1998.
McCulley, Mark, A Road Map of Game and InteractiveMedia Technologies, Apr. 1996, pp. 1–8 from MSDN™ Library—Apr. 1998.
Ledoux, Sue, "Getting Started with Direct3D: A Tour and Resource Guide", Aug. 5, 1996, pp. 1–14, from MSDN™ Library—Apr. 1998.

*Primary Examiner*—Dang Ton
*Assistant Examiner*—Brian Nguyen
(74) *Attorney, Agent, or Firm*—Klarquist Sparkman, LLP

(57) ABSTRACT

An application programming interface implements a method for transparently switching from one communication protocol to another and for restoring the state of a previous connection. The application programming interface executes on a local, client computer, as well as remote computers. It includes functions that multi-user application programs can call to communicate in a device independent manner with other applications executing on remote computers. To support communication on a variety of different computer communication protocols, the application programming interface accesses programs called service providers that implement the communication protocols and support the message passing model of the interface. The application programming interface can transparently switch the protocol on a remote computer by sending a system message to a compatible version of the interface on the remote computer that includes an identifier of the service provider for the new protocol. In response to the message, the application programming interface loads the new service provider and takes steps to set-up a new connection. The application programming interface can also restore the state of previous connection on a remote computer by sending a system message. In response to this message, the application programming interface on the remote computer retrieves the previous connection state from an MRU stack and loads the service provider for the previous connection.

13 Claims, 8 Drawing Sheets

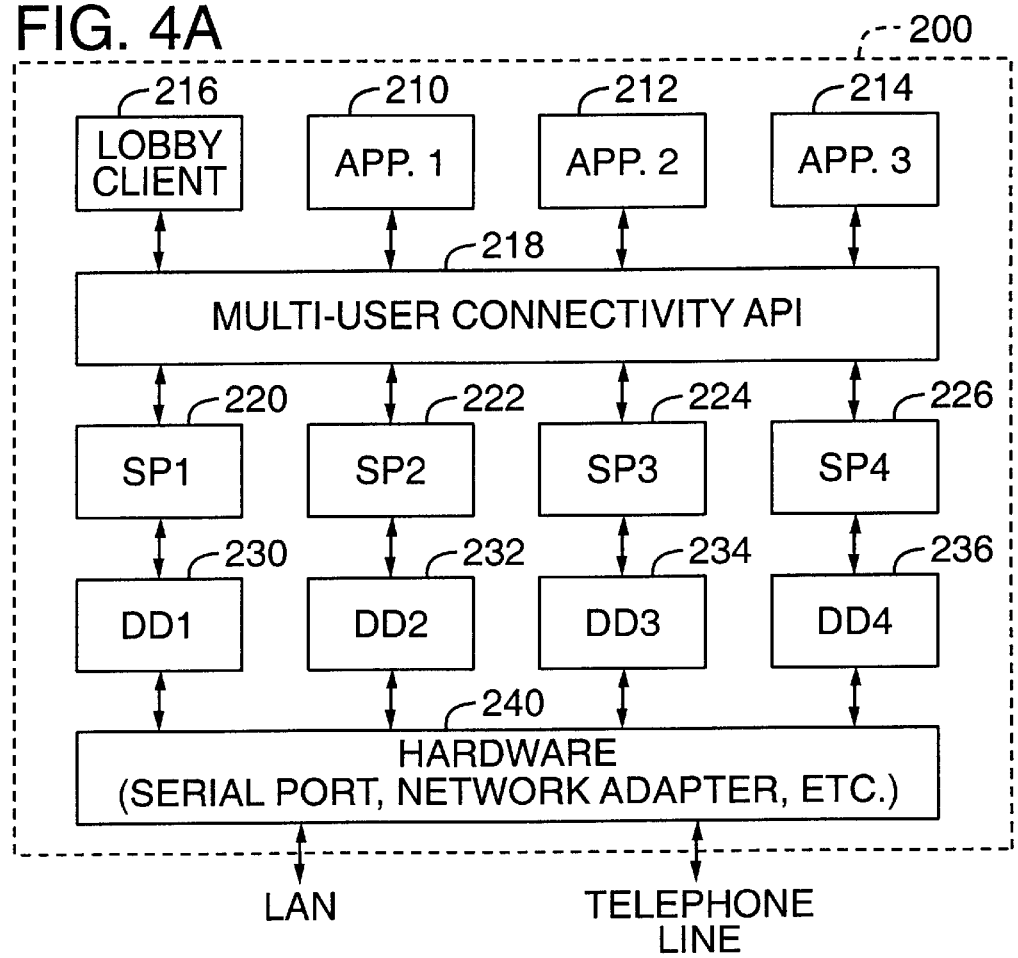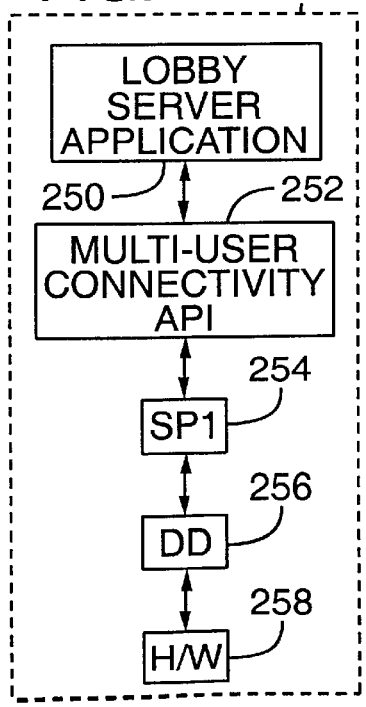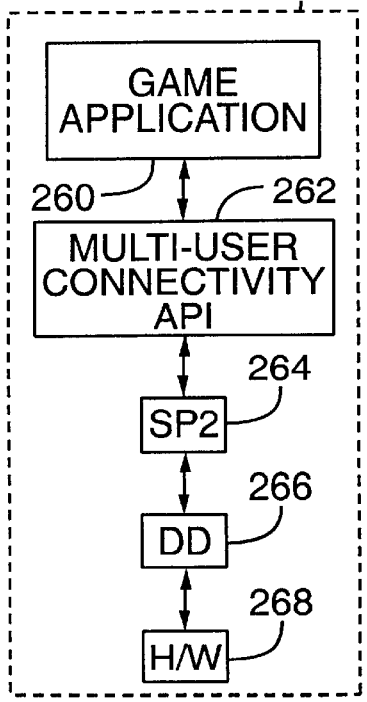

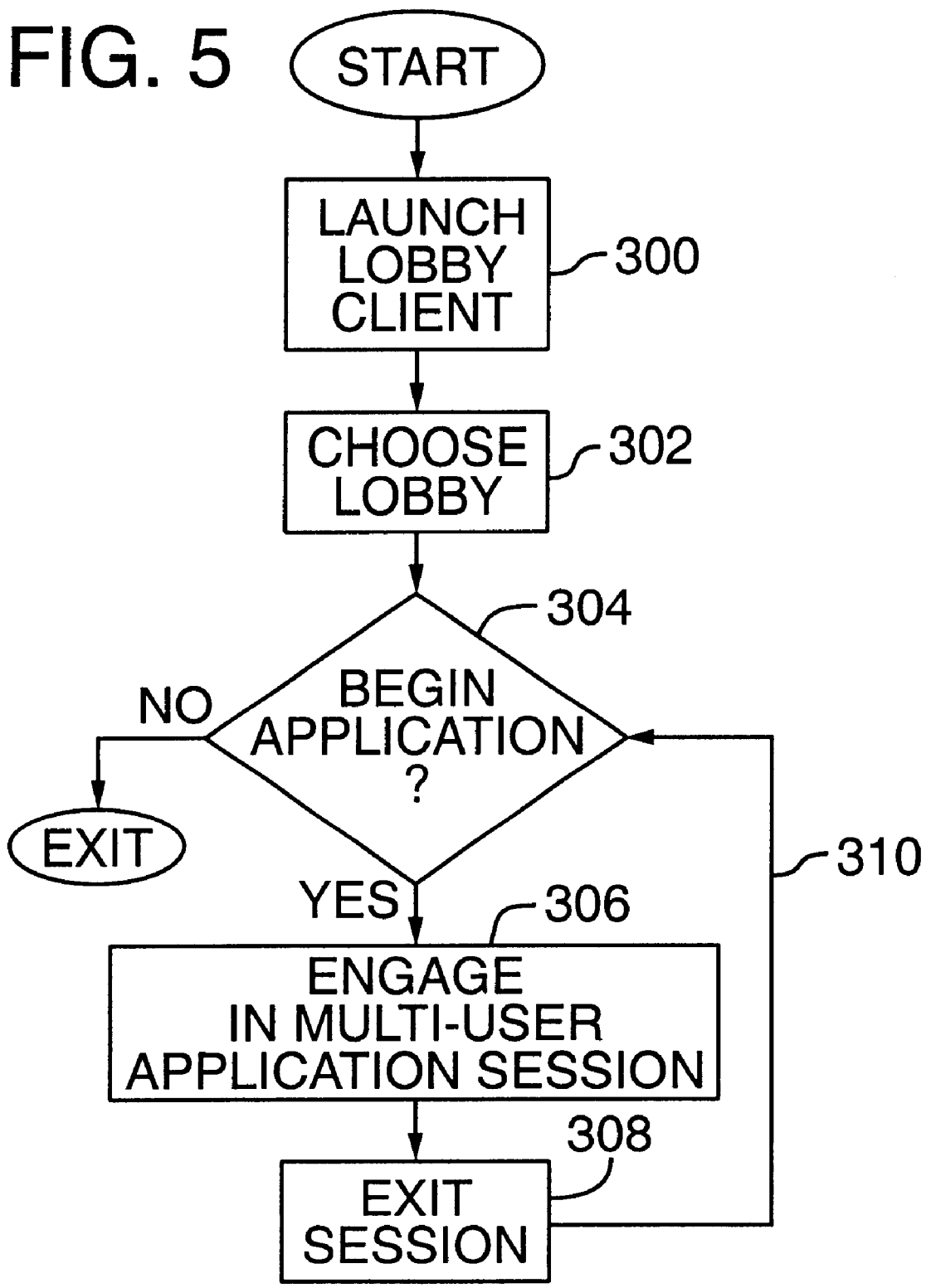

METHOD FOR SWITCHING PROTOCOLS TRANSPARENTLY IN MULTI-USER APPLICATIONS

FIELD OF THE INVENTION

The invention relates to network computing and computer connectivity and more specifically to improving performance of multi-user applications for networks.

BACKGROUND OF THE INVENTION

With the advances in network computing technologies, there is an increasing emphasis in the software industry on software applications that take advantage of the power of network computing to enable users to interact and share information over computer networks. In particular, the prominence of the Internet and applications that take advantage of the Internet have grown dramatically. With this increased emphasis on network computing and the Internet, multi-user applications have become more popular. A multi-user application refers to an application in which two or more users interact over a network. Some examples of multi-user applications include multi-player games, video conferencing and groupware.

While the improvements in network computing have increased the performance of multi-user applications, today's networking technology, especially in the context of the Internet, still has performance limitations. One well-documented limitation of networks, and especially massive wide-area networks like the Internist, is the latency incurred in passing messages among participants of a multi-user application. In interactive applications, such as multi-player games, it is particularly important to minimize the delay in passing messages back and forth between the users' computers.

Another limitation of network computing, especially in the context of highly interactive applications, is the inefficient use of transmission bandwidth of popular network communication protocols. Standard network communication protocols like TCP/IP send data over a network by forming packets to carry portions of the data. Each packet includes layers of address information. In networking applications where transmission bandwidth is limited, the address information further limits the bandwidth available for transferring data between computers.

To illustrate these issues, it his helpful to consider an example of a multi-user application on large, wide area network, such as the Internet. To join into a multi-user application, each participating user establishes a connection between the user's computer and a network interconnecting the users' computers. Each computer can connect to the network through a modem via a telephone line or a network adapter via a local area network (LAN). FIG. 1 illustrates an example of a network connection formed via the Internet where the user typically establishes a dial up modem connection with an Internet Service Provider.

In a multi-user application session, each user may be required to launch a copy of the application on the user's computer. Alternatively, the multi-user application may run on a central computer on the network with which each user of the multi-user application is in communication.

The computers participating in the multi-user application communicate according to a network communication protocol. Standard communication protocols, such as TCP/IP, transfer data in packets. In TCP/IP, the packet is marked with a sequence number, the address of the recipient, and the address of the sender. This addressing information is common in standard protocols so that the protocol can be used for a variety of applications and can be used to address a large number of users.

The transmission delays and inefficiencies of the transmission protocols used on the Internet degrade performance of multi-user applications, and in particular, multi-player games. To address this problem, multi-player games are implemented on dedicated game servers that remote users can connect to via a direct modem-to-modem connection rather than via the Internet. While these game servers provide enhanced performance, they make it more difficult to coordinate multi-player game sessions because each player must know when to connect to the server and what protocol to use.

The Internet can serve as an excellent forum to bring users together. To coordinate a multi-user application session, participants in the session can meet in a virtual lobby hosted on the Internet (or some other wide area network) to establish the time and place for the session. A virtual lobby, typically hosted on a server called a lobby server on the Internet, is a form of a chat room. Users typically navigate to the virtual lobby with a network browser. Once at the virtual lobby, a user interacts with other users by entering text or cursor device input via the graphical user interface (GUY) of the browser. For example, players of a multi-player game might "meet" in an Internet game lobby to plan an immediate multi-player game session on a local server outside of the Internet. Lobbies, with the accessibility advantages of wide area networks like the Internet, can bring thousands of users together to plan multi-user application sessions on smaller networks. Switching to these smaller networks. users of multi-user applications enjoy more efficient communication.

FIG. 1 shows a diagram of the Internet to illustrate the difference between game servers on the Internet and dedicated game servers independent from the Internet. Users 20, 22, 24 of multi-user applications can connect to the Internet through Internet service providers 30, 32, 34, meet in an Internet lobby 36, plan a multi-user application session, and then transfer to the application server 38 hosting the application session without disconnecting from the Internet. However, the performance of this type of multi-user application session is not optimal because a large portion of a packet for a wide area network protocol is devoted to addressing. Further, message packets are routed through multiple Internet routers 40, 41, 42, 43, 44, 45 as well as an Internet Service Provider before being reassembled for each user. The resulting communication is slow and unpredictable, especially for real-time multi-user applications requiring quick responses, such as multi-player games. Such multi-user application sessions may be required to slow down to accommodate the inefficient communication.

A smoother, faster multi-user application session can be achieved by conducting the session on a dedicated multi-user application hub server 50. Note that the direct connection to the server 50 bypasses the Internet. In a game session on the server, messages are routed to the hub, and then to another user 20, 22, 24. Message packets used to communicate through the smaller network need less space per packet for addressing. The resulting communication is more efficient than Internet communication.

The efficiency advantages of current systems using both lobbies and dedicated application servers are balanced by the disadvantages of having to switch manually between multiple communication protocols and links.

FIG. 2 shows the steps taken by a user following current methods of switching between a lobby and a multi-user application session. Under existing systems using both a lobby and a dedicated application server, a user must first choose a protocol (60) and establish a connection (61) to a wide area network hosting a lobby, or directly dial a computer hosting a lobby. The user must then find the lobby on the lobby server or network (62).

After planning a multi-user application session with other users in the lobby (64), each user must then disconnect the communication link with the lobby (66), noting the information required to connect to the dedicated application server. This information may include protocol information, a network address, and/or a telephone number.

Next, each user must connect to the dedicated application server using the information from the lobby. The protocol followed when establishing this new connection may differ from the protocol used to connect to the lobby. If so, the user must select the proper protocol to use (68) and then make the connection (70). Each user must also manually launch a copy of the multi-user application that runs on the user's personal computer (72). The step of manually launching the copy of the application is avoided in a currently available game programming interface called Direct play from Microsoft. However, this is limited to cases where the multi-user application is executed on the existing communication protocol.

Once the users of the multi-user application are connected to the network of the dedicated application server, the session commences (74). Information is routed from one user or application to the other users or applications through the dedicated application server.

When the session is finished, each user terminates the application (76) and disconnects from the dedicated application server (78). To reconnect to the original lobby server, each user must reconnect (61) to the wide area network and visit the lobby, or recall the protocol and phone number for a dial-up lobby.

Current systems using both a lobby and a dedicated application server require the user to manually connect and disconnect numerous times. Users frequently must remember protocol and address information for the various connections.

Some application servers provide dedicated lobby servers that do not require a protocol switch from the lobby to the game application. While such dedicated lobby servers do not require the user to keep track of information needed to switch protocols from the lobby to the game application, they are typically specific to one game application. In addition, they are not flexible enough to deal with cases where a protocol change might be necessary to access a computer on another network or to improve performance.

SUMMARY OF THE INVENTION

The invention provides a method for changing communication protocols on a user's local computer from a remote computer. This method is "transparent" to the user of the local computer because the remote computer sends connectivity information that enables a software module on the local computer to switch communication protocols without prompting the user for connectivity information. In fact, the user does not have to enter any input to change the protocol. An additional advantage of the invention is that it can be implemented so that the application program or programs running on the local computer also do not need to control changes in the communication protocols that they use to communicate with remote computers. For example, in the context of a multi-user application, the version of the multi-user application running on the user's computer does not have to handle the details of switching protocols or restoring the state of a prior connection when the multi-user application session is over.

In one implementation, the method for changing protocols is executed in a software module called a connectivity application programming interface (API). The connectivity API runs on the local computer as well as the remote computers. This module acts as an interface between application programs, on one side, and programs that implement communication protocols called "service providers," on the other side. Applications and other programs can establish a connection with a remote computer by invoking the services of the connectivity API and passing it a connectivity address. The connectivity address is a data structure with encapsulated address information including an identifier of a service provider and other connectivity information such as a phone number, IP address, COM port and modem settings, etc. In response to receiving the connectivity address, the connectivity API sets up a new connection via a service provider, while saving the connection state of an existing connection. At the completion of a session, the connectivity API can be invoked to restore the state of the previous connection. These features of the connectivity API enable it to switch and restore the state of a remote connection transparently to the end-user and local applications.

In one particular implementation, a remote computer changes the protocol on a user's local computer by invoking the connectivity API on the remote computer to send a connectivity address to the connectivity API on the local computer. In response to receiving the connectivity address, the local connectivity API stores the state of the existing connection and loads a service provider to set-up a new connection. The local connectivity API provides the service provider with the connectivity information necessary to establish a new connection. The remote computer can also restore the state of a previous connection by instructing the local connectivity API to recall the stored connectivity state of a previous connection and use this information to restore a connection using a different service provider.

Additional features and advantages of the invention will become more apparent from the following detailed description and the accompanying drawings.

BRIEF DESCRIPTION OF THE DRAWINGS

FIG. 4A is a diagram showing the components of a client computer capable of connecting with a lobby and a dedicated application server using the present invention.

FIG. 4B is a diagram showing the components of a computer hosting a lobby server and capable of connecting with a client computer using the present invention.

FIG. 4C is a diagram showing the components of a computer hosting a multi-player game application and capable of connecting with a client computer using the present invention.

FIG. 5 is a flowchart showing the steps taken by the user of the present invention.

FIG. 6A shows the navigation of the lobby client to the lobby server using a service provider for a TCP/IP connection (service provider 1). FIG. 6B shows the selection of a game application, the launching of the game on the client and the transparent switch to the game protocol (service provider 2) in response to a message from the remote connectivity API.

DETAILED DESCRIPTION

The invention is directed to a method for switching communication protocols and links transparently to participants in a multi-player application. This method can improve the performance of multi-user applications by reducing latency and improving transmission bandwidth. In addition, it simplifies the use of multi-player applications because the user does not have to manually switch protocols or remember address information. Finally, it simplifies application development because the game applications do not have to include code to control protocol switching.

One implementation of the invention is an enhancement to the Direct play application programming interfaces (APIs) marketed by Microsoft Corporation of Redmond, Washington. The Direct play API is a network connectivity API that enables applications to communicate with each other independent of the underlying transport, protocol or on-line service. An implementation of the invention can use the Direct play interfaces to establish connections according to a variety of different protocols without requiring the user or the application programs to handle the details of the connections. Specifically, the implementation can switch to a higher speed connection on another network and then restore an original connection automatically. First, we describe an implementation of the invention with reference to specific software functions and data structures, and then we provide a listing of specifications for the functions and structures from the Direct play API.

Operating Environment of the Invention

Figure 3:
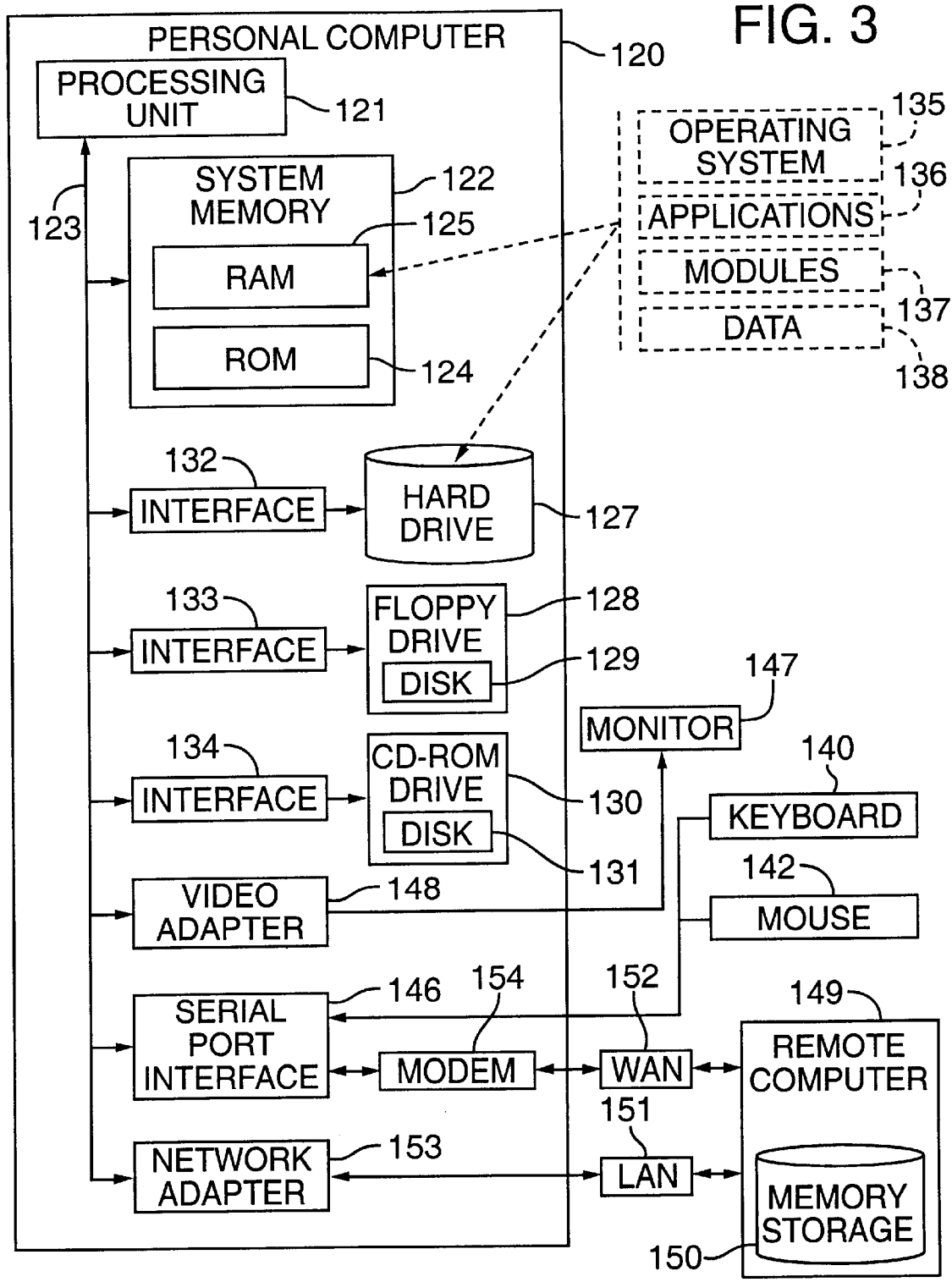
FIG. 3 is a diagram illustrating a computer system that serves as an operating environment for an implementation of the invention.

FIG. 3 and the following discussion are intended to provide a brief, general description of a suitable computing environment in which the invention may be implemented. The invention is implemented in program modules comprising executable instructions that run on a computer.

Generally program modules include routines, programs, components, data structures, etc. that perform particular tasks or implement particular abstract data types. The invention may be ported to other computer system configurations, including hand-held devices, multiprocessor systems, microprocessor-based or programmable consumer electronics, minicomputers. mainframe computers, and the like. The invention may also be implemented in distributed computing environments where tasks are performed by remote processing devices that are linked through a communication network. In a distributed computing environment, program modules may be located in both local and remote memory storage devices.

FIG. 3 illustrates an example of a computer system that serves as an operating environment for the invention. The computer system includes a personal computer 120. including a processing unit 121, a system memory 122, and a system bus 123 that interconnects various system components including the system memory to the processing unit 121.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of data, data structures, computer-executable instructions (program code such as dynamic link libraries, and executable files), etc. for the personal computer 120.

Although the description of computer-readable media above refers to a hard disk, a removable magnetic disk and a CD, it can also include other types of media that are readable by a computer, such as magnetic cassettes, flash memory cards. digital video disks, Bernoulli cartridges, and the like.

A number of program modules may be stored in the drives and RAM 125, including an operating system 135, one or more application programs 136, other program modules 137, and program data 138.

A user may enter commands and information into the personal computer 120 through a keyboard 140 and pointing device, such as a mouse 142. Other input devices (not shown) may include a microphone, joys tick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB).

A monitor 147 or other type of display device is also connected to the system bus 123 via an interface, such as a video adapter 148. In addition to the monitor, personal computers typically include other peripheral output devices (not shown), such as speakers and printers.

The personal computer 120 operates in a networked environment using logical connections to one or more remote computers, such as a remote computer 149. The remote computer 149 may be a server, a router, a peer device or other common network node, and typically includes many or all of the elements described relative to the personal compu tear 120, although only a memory storage device 150 has been illustrated in FIG. 3. The logical connection depicted in FIG. 3 include a local are network (LAN) 151 and a wide area network (WAN) 152. Such networking environments are commonplace to offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 54 or other means for establishing communications over the wide area network 152, such as the Internet. The modem 154, which may be internal or external, is connected to the system bus 123 via the serial port interface 146.

In a networked environment, program modules depicted relative to the personal computer 120, or portions of them, may be stored in the remote memory storage device. It will be appreciated that the network connections shown are exemplary and that other means of establishing a communications link between the computers may be used.

Implementation Overview

As summarized above, the invention provides a method for transparently switching protocols to improve performance and simplify the user operation and application development of multi-user applications. The invention is implemented in a connectivity API that manages connections through a variety of program modules called service providers. The service providers contain network specific code necessary to establish a specific type of connection between computers, such as a direct modem-to-modem connection, a serial connection, an Internet TCP/IP connection, and an IPX connection. The connectivity API includes an API function for changing protocols on a remote computer. This function causes a copy of the connectivity API on the remote computer to manage the process of setting up a new connection, including changing protocols (if necessary) and also saving the state of an existing connection. The connectivity API includes another function for restoring the state of the connection. These functions enable the connectivity API to switch protocols transparently to the user. In addition, they allow an application to change and restore a connection of a remote computer without requiring control from application programs executing on the remote computer.

Below, we describe an implementation of the invention using the example of a "virtual lobby" on the Internet. Like the virtual lobbies described in the background section, the virtual lobby in this example is a program running on a server that acts as a meeting place for participants in a multi-player application, and in particular, a multi-player game. The virtual lobby provides a central location on the Internet (or possibly some other network) that users can access to meet other players and initiate a multi-player game session.

To access the lobby server, users invoke a program called a lobby client, executing on their computers to make a connection with the lobby server. When users choose to begin a game, they select the game via the user interface of the lobby client. The lobby server application then invokes a copy of the connectivity API running on the server to send the users' computers the information needed to establish a multi-player game session. The connectivity API running in each of the users' computers uses this address information to establish a connection with a game server and set-up a multi-player game session. The connectivity API will switch protocols for the multi-player application session and then restore the state of the original connection automatically when the session is terminated.

Software Architecture Overview

FIGS. 4A through 4C are diagrams illustrating the software architecture on a client computer 200, a computer 202 hosting the lobby server, and a computer 204 hosting a multi-player game application, respectively. More specifically, FIG. 4A illustrates the program modules in a typical configuration of a client computer 200, the computer of a participant in the multi-player application. FIG. 4B illustrates the program modules in the lobby server 202, a remote computer that each player accesses to coordinate a multi-player game. Finally, FIG. 4C illustrates the program modules in a computer 204 that hosts the multi-player game session.

In the example of FIG. 4A, the client computer is executing several application programs 210–216, including an application called a "lobby client" 216. The client computer 200 has a multi-tasking operating system, namely the Windows 95 operating system, which enables the applications 210–216 to execute concurrently. The applications 210–214 and the lobby client 216 invoke the services of the connectivity API 218. The connectivity API 218 provides a device-independent, and transport independent interface to connectivity services. For example, if an application 210 running on the client computer wishes to send a message to another application running on a remote computer, the application 210 invokes device independent functions of the connectivity API 218 to send the message. The connectivity API 218, in turn, invokes the services of a connection-dependent service provider (e.g., 220–226) to send the message over a connection medium associated with the service provider.

The service providers 220–226 use device-dependent drivers 230–236 to send data to a remote computer via a hardware device 240 such as a modem or network adapter, or port of the computer such as a serial or parallel port. The software drivers for devices, such as modems or network adapter cards, are typically available from the device manufacturer. The software drivers for serial and parallel ports are usually bundled with the operating system, as in the case of the Windows 95 operating system.

There is no explicit connection between the client computer 200 and the lobby or game servers because the architecture supports a variety of types of connections. For example, the client computer can establish a connection with the lobby and the game server via a local area network, a direct modem-to-modem connection, or via a wide area network (e.g., through a dial-up connection to the Internet).

FIG. 4B shows the program modules on the computer 202 that acts as the lobby server. The lobby server executes a lobby server application 250, the connectivity API 252, one or more service providers (e.g., 254), and one or more device drivers (e.g., 256). The lobby server application 250 implements the virtual lobby, which users access to coordinate a multi-player game session. In this implementation, the structure and function of the connectivity API 252, service provider 254, and device driver 256 are the same as their counterparts on the client computer.

Lobby servers are typically located on the Internet. In this case, the client computer would likely access the lobby server by establishing a dial-up connection. The connectivity APIs 218 and 252 on the respective machines communicate with each other via the same type of service provider (e.g., 220 and 254), which in this case, would be a service provider for a TCP/IP connection. The device drivers are specific to the type of hardware used in each machine to connect to the Internet. For example, if the client computer were connected to the Internet via a dial-up connection, the device driver would be a modem driver.

FIG. 4C shows the program modules executing on the computer hosting the multi-player game application. The multi-player game application 260 invokes the connectivity API 262 to send messages to and receive messages from the client versions of the game application (e.g., app. 210 in FIG. 4A) on the client computers. In the example shown here, we assume that the game application is executing on a dedicated game server that is accessed via a direct modem-to-modem connection. As such, the connectivity API 262 uses a service provider 264 that is specific to a modem-to-modem connection. In an implementation for the Windows 95 operating system, the service provider 264 uses the telephony Application Programming Interface (TAPI) provided with the operating system to perform call control functions and uses the communication APIs provided with the operating system to send and receive messages in serial data stream. The service provider 264 uses a device dependent modem driver 266 to communicate with a modem 268.

Having provided an overview of the software architecture, we now describe the program modules of an implementation in more detail.

The Connectivity API-Service Provider Architecture

The connectivity API uses a send/receive communication model to implement an API that enables applications in a multi-player game session to communicate with each other. Each computer participating in a multi-player game session has the following components: 1) a connectivity API, and 2) one or more service providers. The connectivity API provides a common interface to the applications (e.g., applications—in FIG. 4A) and hides the details of making connections and sending data over a specific communication medium from the applications. When sending or receiving data, the application need only concern itself with the performance of the communication medium. The application does not need to know whether the medium is provided by a modem, network, or on-line service.

At run-time, the connectivity API binds with a service provider installed on the user's computer. Specifically, to access the services of the connectivity API, an application invokes a function call in the API to create an instance of a connectivity object and specifies the communication medium. In response, the connectivity API creates an instance of the connectivity object, loads the service provider (if not already loaded) associated with the communication medium and binds the object to that service provider. The connectivity object adheres to the COM specification and exposes its functionality via a COM interface. Implemented as Windows dynamic link libraries, the service providers bind to the COM object.

The connectivity API includes an Enumerate fiction that an application can use to list of all of the service providers installed on the system. This is one of the functions that the connectivity API uses to support several communication transports and protocols. To utilize transport and protocol independent communication services, the application selects a service provider and instructs the connectivity API to create a connectivity object that uses the service provider. The connectivity API uses a send/receive communication model to send messages between players. To implement this communication model, the connectivity object maintains a message queue for each player managed by the application. An application can manage more than one player. The connectivity objects communicate messages to each other. When a connectivity object receives a message, it makes a copy of the message for the message queue of each player for which the message is destined.

Messages can be sent according to a peer-to-peer or client-server paradigm. In an implementation of the peer-to-peer paradigm, for example, an application can send a message on behalf of a player to any other player in a multi-player game session. One of the client computers is designated as a session host whose purpose is to arbitrate new computers joining a session and to assign ID numbers when new players and groups are created. In an implementation of the client-server paradigm, all messages can be sent to a "server" player on a host computer (e.g., the game server), which forwards the messages to the appropriate "client" players.

An application can use the connectivity API to send messages among players. To send a message, the application invokes a send message function, implemented as a member fiction of the connectivity object. The application specifies the destination of the message by providing a player ID.

While most messages are defined by the application, some messages are defined by the connectivity API. These messages are referred to as system messages, since they do not originate from an application. For example, when a player quits or a new player joins a session, the application receives a message from the connectivity API that provides the name of the player and the status change that has occurred. The system messages are sent by a "virtual player" that has a player ID defined in terms of a constant DPID_SYSMSG.

Another form of message is a broadcast message. A message is broadcast to all players of a session by sending the message to a player ID defined by a constant DPID_ALL_PLAYERS. Similarly, a message is broadcast to all players of a group by sending the unique group ID created for a group.

The connectivity API also uses messages to set-up and to restore remote connections. The connectivity API includes functions to instruct a remote copy of the connectivity API to create a new connection and to restore the state of a former connection. In both cases, the connectivity API on one computer sends a message to the connectivity API on another computer, instructing the second connectivity API to change a connection. To set-up a new connection, the connectivity API provides an address with the message that includes the information necessary to establish the new connection. To restore a previous connection, the connectivity API that originates the message can provide an ID of the previous connection that it wishes to restore. However, as a default, the connectivity API that receives this message will restore the immediate, prior connection.

In the case where the connectivity API cannot establish a new connection according to a message from a remote connectivity API, the local connectivity API reverts to the original connection it had with the remote connectivity API. If the local connectivity API is successful in resuming the original connection, it reports the failure to establish the new connection to the remote connectivity API in another message.

It is significant to note that the application programs do not get involved in the process of changing protocols. Instead, this process is transparent to the applications and is handled entirely within the connectivity API. The messages sent between the connectivity API running on the respective computers are not sent to or processed by the application programs that use the connectivity API's services.

The connectivity API manages multi-player applications in terms of sessions, players, and groups. Each of these terms is described further below.

Session Management

A "session" is an instance of several applications on remote machines communicating which each other. An application uses session-management functions of the connectivity API to open or close a communications channel. An application either creates a new session or enumerates existing sessions and finds one to connect to. The application that creates the session is referred to as the "host". The host assigns player and group ID numbers and regulates new applications joining the session.

The connectivity API includes a member function called EnumSessions that enables an application to locate all the existing sessions in progress on the network. The Open member function is used to create a new session or connect to an existing one. A session is described by its corresponding data structure called DPSESSIONDESC2. This structure contains application-specific values and session particulars such as the name of the session, an optional password for the session, and the number of players to be allowed in the session. After opening a session, an application can call the GetCaps member function to retrieve the speed of the communications link and other properties of the network and service provider.

When an application wishes to leave a session it can use the Close member function. If the session host leaves the session, the host will migrate to one of the other players in the sessions and generate a DPSYS_HOST system message.

Player Management

An application uses player-management functions in the connectivity API to manage the players in a session. In addition to creating and destroying players, the application can enumerate the players or retrieve a player's communication capabilities. Functions called CreatePlayer and DestroyPlayer create and delete players in a session.

The connectivity API assigns the player a Player ID. Applications and the connectivity API use the Player ID to route message traffic.

An application uses the EnumPlayers member function of the connectivity API to discover what players are in a current session and their friendly and formal names. This function is typically called immediately after a call to the Open member function that joins an existing session. It can also be used when the application needs to iterate through all the players in a session. A function called GetPlayerCaps retrieves information about the speed of a player's connection to the session.

Group Management

The group-management functions of the connectivity API allow applications to create groups of players in a session. An application can then use a single call to the Send member function to send messages to an entire group, rather than to one player at a time. Some service providers can send messages to groups more efficiently than sending them to the individual players in the group (multicasting), so in addition to simplifying player management, groups can be used to conserve communication channel bandwidth.

The CreateGroup and DestroyGroup member functions of the connectivity API create and delete a group of players. The connectivity API assigns a Group ID to the group. The group is initially empty; the application uses the AddPlayerToGroup and DeletePlayerFromGroup member functions to control the membership of the group.

To discover what groups exist, the application can call the EnumGroups member function. To enumerate the players in a specific group, the application can call the EnumGroupPlayers member function.

Message Management

As introduced above, the connectivity API provides message-management functions that allow an application to route messages between players. The application can use a Send member function to send a message to an individual player, to a group, or to all the players in the session, by specifying a player ID, a group ID, or DPID_ALL PLAYERS for the destination. There is no limit to size of the message that Direct play can send. An application can call GetCaps to find out the maximum number of bytes that can be sent in a single packet. Larger messages are sent using several packets.

To receive a message from the message queue, an application uses a Receive member function. This function allows the application to specify whether to retrieve the first message in the queue, only the messages TO a particular player ID, or only those FROM a particular player ID. The application can use the GetMessageCount member function to retrieve the number of messages waiting for a given player.

The connectivity API generates system messages that are used to notify players of changes in the session. System messages are FROM a virtual player defined by the following ID: DPID_SYSMSG. The application can control what system messages are generated through the use of flags in a data structure called SESSIONDESC2 structure.

Service Providers and the Service Provider Interface

Service providers are program modules that include network specific code used by the connectivity API to communicate over a network. The service providers include code needed to send and receive messages over a specific connection medium. The connectivity API is responsible for managing the session and the players and groups in that session. It is also responsible for generating or directing messages, and responding to messages. The service provider acts as a transport to send a message from one computer to another at the request of the connectivity API.

In an implementation for the Windows 95 operating system, service providers are implemented as Windows dynamic link libraries (DLLs). Examples of service providers include a service provider for direct modem-to-modem connections, a service provider for a serial connection, a service provider for an Internet TCP/IP connection, and a service provider for an IPX connection. The service providers in the current implementation are implemented using components of the Windows 95 operating system. For example, the direct modem-to-modem connection is implemented using TAPI for call control functions and using the communication APIs in Win32 API.

As another example, the service provider for the TCP/IP connection includes the implementation of the service provider interface functions (as described in this specification), which communicate with Winsock, the sockets application programming interface in the Windows Operating System. Winsock communicates with a TCP/IP stack, which in turn communicates with either a modem or network device driver. Winsock and the TCP/IP stack are provided with the Windows Operating System. The device drivers are typically provided by the device manufacturer.

To install a service provider on a computer with the Windows 95 operating system, the compiled DLL representing the service provider is copied to the Windows SYSTEM directory (SYSTEM32 on Windows NT) and registry entries are created identifying the service provider. The following example is a registry (REG) file that will add the appropriate registry entries to the registry of the operating system. Note that a single DLL may implement several service providers. In this case, each service provider has its own registry entry, but all have the same DLL listed as the Path.

```
REGEDIT4
[HKEY_LOCAL_MACHINE\Software\Microsoft\DirectPlay]
[HKEY_LOCAL_MACHINE\Software\Microsoft\DirectPlay\
              Service Providers]
[HKEY_LOCAL_MACHINE\Software\Microsoft\DirectPlay\
              Service Providers\
              name_of_service_provider]
"Guid"="{0F1D4860-8AD9-11cf-9A4E-00A0C805435E}"
"Path"="dpmysp.dll"
"dwReserved1"=dword:0
"dwReserved2"=dword:0
[HKEY_LOCAL_MACHINE\Software\Microsoft\DirectPlay\
              Service Providers\
              name_of_service_provider\
              Address Types\
              address_type_guid]
```

The parameter name_of_service_provider is the name of the service provider as it appears in the list that the user can select from when choosing a service provider. The name will be passed to SPInit in the lpszName parameter.

The parameter Guide is a unique number of the service provider. This will be passed to SPInit in the lpGuid parameter.

The Path parameter is the name of the DLL which implements this service provider.

The parameter address_type_guide represents one or more GUIDs indicating what address type(s) this service provider uses to locate a session on the network. If no network address is needed, then this key is not required. (e.g. Internet TCP/IP needs an IP address so the GUIDE_DPAID_INet is created as a key. The format of these addresses is described in more detail below.) The connectivity API interacts with the service provider through the service providers programming interface. An implementation of this interface includes the functions summarized below.

| | |
|---|---|
| SPInit | Initialization of the service provider |
| SP_EnumSessions | Locate one or more session hosts (name servers) on the network and send them a message |
| SP_Send | Send a message to another computer on the network |
| SP_Reply | Reply to a message received from another computer on the network |

In addition to the interface and member functions described above, the connectivity API has a COM interface called IdirectPlaySP that service providers can access to invoke services of the connectivity API. The following table lists these functions.

| | |
|---|---|
| AddMRUEntry | Add service provider specific data to an MRU list |
| CreateAddress | Create an Address for this service provider |
| EnumAddress | Enumerate the chunks of information from the Address. |
| EnumMRUEntries | Enumerate the current entries in the MRU list |
| GetPlayerFlags | Get the flags associated with a given Player/Group ID |
| GetSPPlayerData | Retrieve the service provider specific data associated with a Player/Group ID |
| HandleMessage | Pass a message to for processing |
| SetSPPlayerData | Associate some service provider specific data with a Player/Group ID |

A more detailed specification of the functions listed above is provided I later in this description.

Message Structure

The structure of a message from the connectivity API includes a message body supplied by the connectivity API and a message header. The message header is a portion of the message that the service provider can reserve to fill in additional information, such as an address. When the connectivity initializes a service provider, the service provider can return a parameter to indicate the size of the message header. This parameter specifies the size of the message header in bytes. When the connectivity API requests the service provider to send a message, it will leave the specified number of bytes open at the beginning of a message buffer so that the service provider can use this portion of the message structure as a header. Note that the service provider does not have to add any header to the message if no header is necessary to route the message to the intended recipient. This allows the service provider to maximize the use of the transmission bandwidth for sending data from the application, as opposed to sending address information.

Encapsulation of Network Address Data

The connectivity API uses an encapsulated address format to represent network address information. When the connectivity API wishes to create a session, it provides the encapsulated address information to a specified service provider. The encapsulated address provides all of the information that the service provider needs to establish a connection. Throughout this specification, we use the general term "connectivity address" to refer to a network address.

The connectivity address is made up of a series of chunks. Each chunk consists of the following:

1) A GUIDE indicating what type of data is contained in the chunk;
2) The size of the data; and
3) The data field.

When a service provider receives a connectivity address, it parses it for useful information and saves it in a data structure such as a subkey in the registry of the Windows operating system. Though not required, the connectivity address is preferably stored as a subkey to the key used to register the service provider in the registry. This method of storing the connectivity address is advantageous because it provides an effective way to ensure that the address is removed when the service provider is de-installed. Specifically, when the service provider is de-installed. the operating system removes its key in the registry, and all of the subkeys associated with its key.

The service provider can then use the EnumAddress function of the connectivity API to parse individual chunks. The service provider presents a diatog box asking the user for more information only if the information in the connectivity address is incomplete.

One implementation of the connectivity address has predefined the following chunk identifiers:

| Identifier GUID | Type of data |
|---|---|
| DPAID_ServiceProvider | 16 byte GUID of the service provider that this address was created for. This chunk may be ignored since it possible for several different service providers to use the same type of network address. |
| DPAID_Phone | ASCII string representing the numeric digits of a phone number. |
| DPAID_Inet | ASCII string representing an IP address of the form "xxx.xxx.xxx.xxx" or a server name e.g. "dplay.microsoft.com" |
| DPAID_ComPort | A DPCOMPORTADDRESS structure which specifies:<br>COM port to use (1–4)<br>Baud rate (100–256k)<br>No. stop bits (1–2)<br>parity (0-none, 1-odd, 2-even, 3-mark)<br>flow control (0-none, 1-xon/xoff, 2-rts, 3-dtr, 4-rts/dtr) |

The connectivity API uses this address to control transparent protocol switching on a remote computer. When an application invokes a RemoteConnect function and passes a connectivity address and the destination address of the connectivity API, the connectivity API sends a message to the connectivity API a specified in the destination address along with the connectivity address. The connectivity API at the destination then uses the connectivity address to establish a new connection with the newly specified service provider. The details of an implementation of RemoteConnect are provided below.

Lobby Related Program Modules

The connectivity API includes a programming interface that enables lobby-related programs to interact with multi-user applications that use the connectivity API. By bringing users on remote computers together, lobby software provides a matchmaking fiction to coordinate multi-player application sessions. The lobby-related functions in the connectivity API enable lobby software to initiate a multi-player session automatically. In particular, the lobby software can use the functions in the connectivity API to switch protocols, launch an application, and add the application to a multi-player session.

The lobby software includes the lobby client and the lobby server application. The lobby client runs on the user's computer and provides a user interface through which the user can access a "virtual lobby" and locate other user's to engage in a multi-player application session. The virtual lobby is most commonly used to plan multi-player game sessions.

The lobby server application is a program that hosts the lobby, running on a lobby server. The lobby server may be a permanent server that the client computer communicates with via a direct modem-to-modem dial up connection. Alternatively, the lobby server may be located on a network, such as a site on the Internet or a peer computer acting as the lobby server on a peer-to-peer network.

The connectivity API includes functions that the lobby client can use to initiate a multi-player application session. Once a group of players have decided to start a session, the lobby client can invoke functions in the connectivity API to launch an application and provide it with information needed to select a service provider and connect to the session. In addition, the lobby server can use the Remote connection fiction to connect an application to a multi-player application session.

The connectivity API includes functions to allow the lobby client to interact with and determine information about applications that are written for the connectivity API ("compatible applications"). The lobby client can determine which compatible applications are installed on the client computer through a function called EnumLocalApplications. It can also determine what service providers are available through a function called DirectPlayEnumerate. Once a user has decided to join a session and the lobby client has verified that the application and service provider needed are available, it can launch the application and connect it to the session through the RunApplication method. In this call, the lobby client will specify what application to run, which service provider to use, what information the service provider will need to get connected to the session (using the CreateAddress and EnumAddress methods), and the name the user is known by within the lobby environment. The connectivity API will locate the application executable and launch it with the appropriate command line switches. The connectivity API will also store all the service provider and connection information.

Rather than requiring the application to establish a connection for a session, the lobby server application can use the RemoteConnect function to switch protocols transparently. The lobby server application can invoke the RemoteConnect function and pass the connectivity address needed to connect the client computer to multi-user application session.

When the session is over, the host of the multi-user application can use the Restore function to restore the state of the user's connection to the lobby server.

Multi-user Applications

In a multi-user application session, there is a version of a multi-user application on each of the user's computer. In a peer-to-peer paradigm, one of the applications acts as the host of the session. In a 6lent-server paradigm, there is an application that acts as a server and all other participating applications are clients to this server.

To illustrate the operation of the invention, we describe an example where the host of the multi-user application is a multi-player game application executing on a dedicated application server. FIG. 4C above shows the program modules relevant to this example on a game server. The software executing on the server includes the multi-player game application, the connectivity API, a service provider, and a device driver.

To improve performance of the multi-player game, the game server is preferably a dedicated server that the client computer of each game participant connects to via a direct modem-to-modem connection. Because the connectivity API can use a variety of different types of service providers, it is possible that the client computers will use another communication medium to connect to the multi-player application session. In fact, it is possible that some client computers involved in a session will use a different communication medium than other client computers in the same session.

It is important to emphasize that the host of the multi-player game session does not have to be based on a client-server model where each user is a client and the host application executes on a game server. The multi-player game can be based on a peer-to-peer paradigm, and one of the player's computers can also act as the host of the game session.

Example Illustrating the Operation of the Connectivity API

The invention simplifies the operation of multi-player games from the standpoint of the user because it eliminates the requirement that the user manually change communication protocols when entering or exiting a multi-player game session. In the specific case of the lobby, the invention reduces or eliminates the need for input from the user when switching between the communication protocols for the lobby and the multi-user application session. By reducing the number of manual connections that the user has to make and eliminating the need to enter address and protocol information, the invention allows the user to enjoy better game perfon-ance without the inconveniences of switching protocols manually.

FIG. 5 is a flow diagram showing the steps that are initiated or performed by a user in a lobby application that uses the connectivity API to initiate a multi-player game session. The operation of the connectivity API and service providers are detailed in the next section.

Before entering a multi-player game session, the user begins by visiting the lobby. To visit the lobby, the user launches a lobby client on the client computer (300). For a Windows-based application, this is typically accomplished by using the mouse to click on the lobby client application. One example of a lobby client application is an Internet browser such as the Internet Explorer browser from Microsoft Corp.

Next, the user connects to a lobby by selecting the lobby through the user interface of the lobby client (302). After initially entering protocol and address information, the user can make subsequent connections to the lobby by merely choosing the lobby without entering any address information. For example, the user might click on an icon that initiates a connection process using stored protocol and address information.

Once in the lobby, the user meets with other users, selects an application. and selects a game server. If the user wishes to initiate a multi-player game session (304), she will coordinate the selection of an application and game server with other users visiting the lobby and submit her selection of the application and game server to the lobby server. The selection of an application and game server effectively begins the game application from the perspective of the user. The connectivity API manages the details of switching communication links and protocols, launching the application on the client, establishing a connection to the application server, and opening a multi-user application session.

Next, the user engages in a multi-user application session (306). When finished, the user closes the application or otherwise indicates that the session is over (308). The connectivity API manages the details of closing the session, terminating the connection to the application server, and re-establishing a connection to the lobby.

The return arrow 310 in FIG. 5 represents that the connectivity API restores the user's connection to the lobby and returns the user to the lobby. Now returned to the lobby, the user can plan another multi-user application session by finding a new group of users, a new application, and/or a new application server. If the user wishes to exit the lobby, the user can navigate to some other site on the Internet or terminate the lobby client.

Figure 6A:
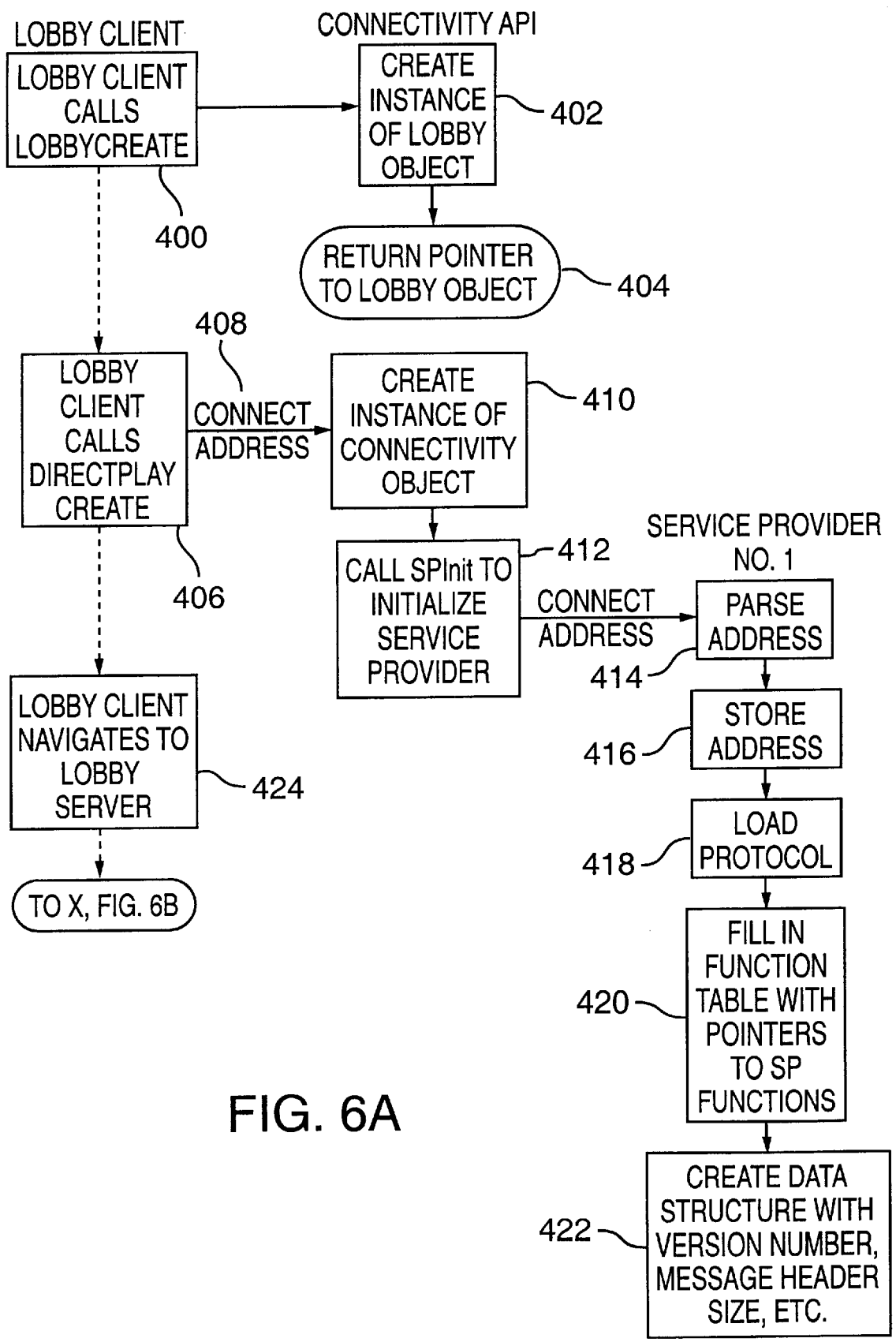
FIGS. 6A and 6B are diagrams illustrating the operations of a lobby client, lobby server and corresponding connectivity API modules for an initial phase of the game session shown in FIG. 5.
Figure 6B:
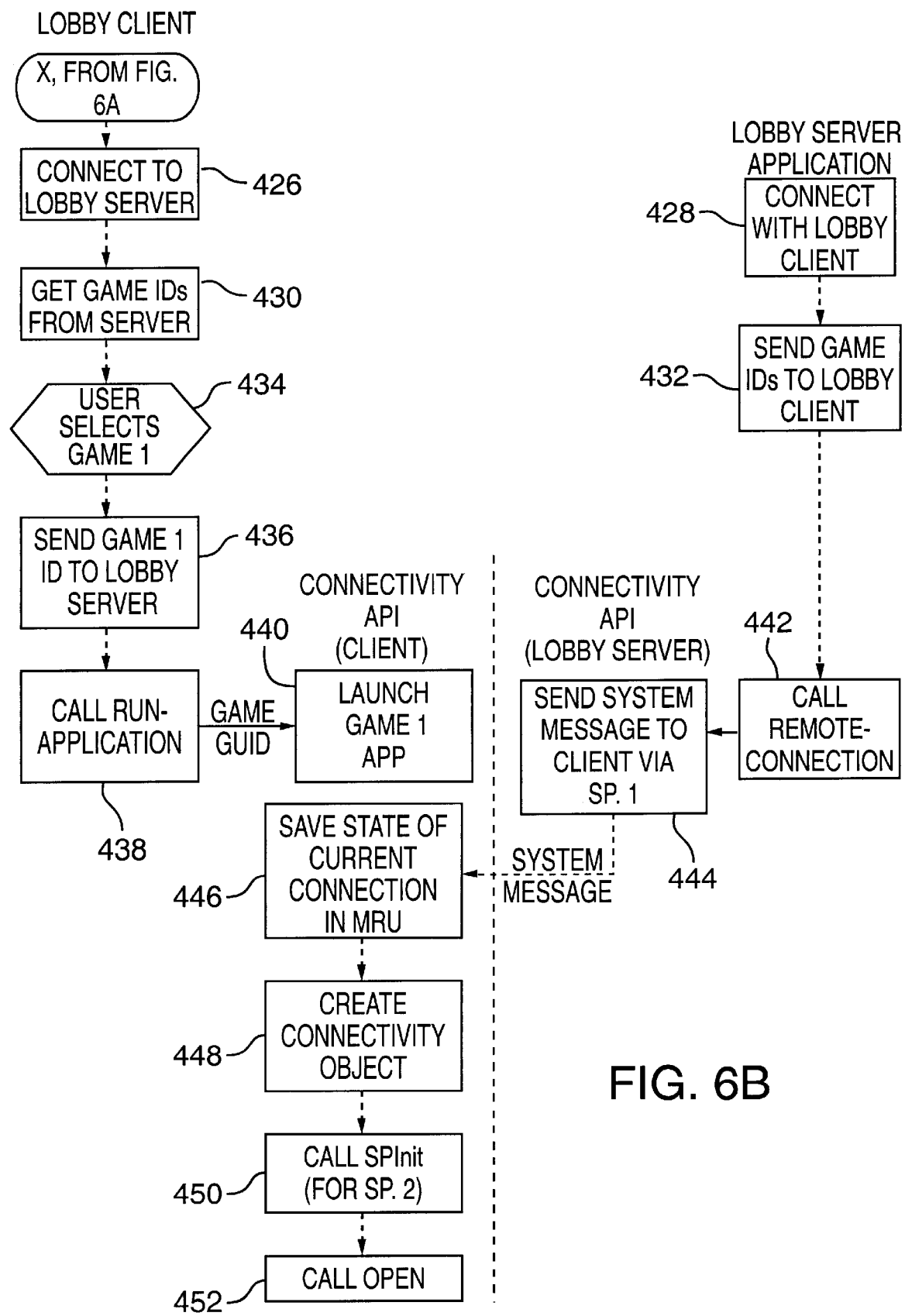
Figure 7:
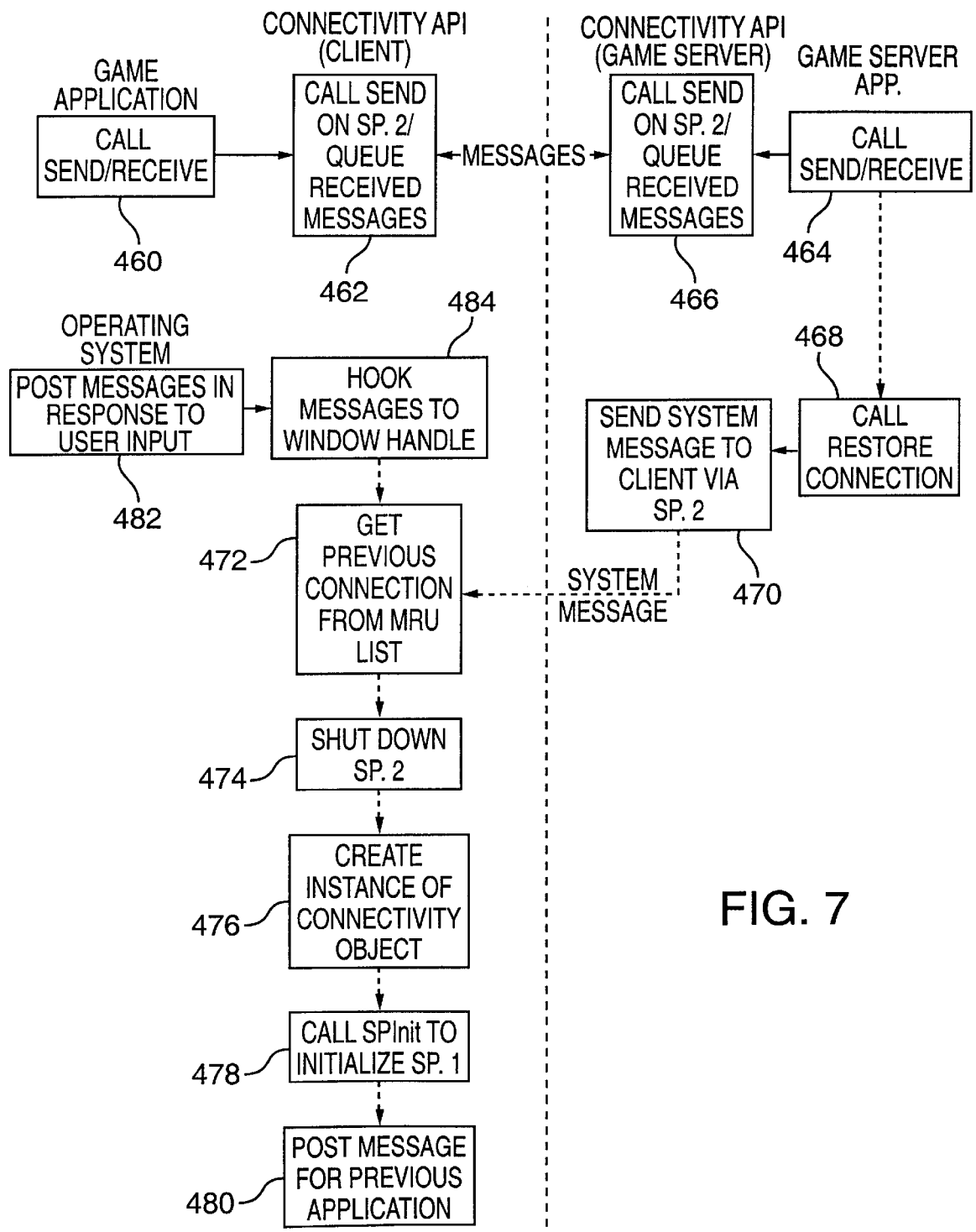
FIG. 7 is a diagram illustrating the operation of the client and server game applications and their respective connectivity APIs at the end of a game session when the remote connectivity API restores the state of previous connection on the client.

FIGS. 6A–B and FIG. 7 are block diagrams illustrating the operation of the remote connection and restore functions using the example provided in FIG. 5. Specifically, FIGS. 6A and 6B illustrate how a lobby server uses the remote connection function to switch the client computer's physical connection and communication protocols from the lobby server to the game server.

To distinguish among software components, FIG. 6A shows the operations of the lobby client, the connectivity API and the service provider for the TCP/IP connection (Service provider 1) in three separate columns. Each of these components is in the client computer. FIG. 6A begins at the point where the operating system has launched the lobby client in response to a user request. The lobby client begins by performing some preliminary steps to initialize the connectivity software in the user's computer. In one of these preliminary steps, the lobby client calls LobbyCreate (400) to create a lobby object. To accomplish this, the lobby client calls a LobbyCreate function in the connectivity API (namely, the Direct play Lobby Interface). In response, the connectivity API creates an instance of a lobby object (402) and returns a pointer to this lobby object (404). The lobby object provides an interface through which lobby-related APIs can be called.

In another preliminary step, the lobby client creates a connectivity object by invoking the DirectPlayCreate function (406) in the connectivity API. The lobby client passes a connectivity address (408) to the connectivity API when it invokes this function. The connectivity address includes the address information needed to establish a remote connection via the service provider. In response, the connectivity API creates an instance of a connectivity object (410) and returns a pointer to the object. In creating this object, the connectivity API invokes the SPInit function of the service provider to initialize the service provider (412). The service provider parses the connectivity address data (414) and stores it for future use (416). The service provider also makes sure that it has the resources that it needs (e.g., the hardware and software and communication protocols) and loads the communication protocol (418). In addition, the service provider fills in a data structure with the pointers to the functions that it has implemented (e.g., a function table) 420, the version number, and the message header size (422).

In the case where the lobby server is located on the Internet, the service provider is the service provider for a TCP/IP connection. This service provider implements the TCP/IP protocol.

The lobby client performs functions that enable the user to visit the lobby server. In response to a request to access the lobby server application, the lobby client acts as a network browser. It performs conventional network browsing functions to access the lobby server application (424).

To show the interaction between the client and the lobby server, FIG. 6B illustrates the operation of the lobby client and client connectivity API on the left, and the server connectivity API and lobby server application on the right. The dashed line separates the client and server software components and represents the communication medium used to communicate between the connectivity APIs of the client and server, namely, the TCP/IP connection and the TCP/IP service providers on each computer. As shown in FIG. 6B, the lobby client and lobby server establish a connection with each other via the TCP/IP protocol (426, 428). The lobby client sends data to and receives data from the lobby server application to enable the user to coordinate a game session. Specifically, in this example, the lobby client gets a list of the game identifiers (IDs) (430) by requesting them from the lobby server application via the TCP/IP connection. In response, the lobby server sends the application identifiers (432).

When the user selects a game application and a game server (434), the lobby client sends a message to the lobby server application, specifying the application and the server that the user has selected (436).

When the user selects a game application, the lobby client invokes the RunApplication method of the lobby object on the client computer (the local user's computer) (438) and passes the lobby object the application identifier (an application GUIDE). The application identifier is a universally unique identifier assigned to the game application program. This causes the lobby object to launch the game application on the user's machine (440) by identifying the application GUIDE to the Windows operating system and requesting the operating system to execute the game.

At this point, the modem on the user's machine is still being used for the connection to the lobby server application. To change the communication protocol as well as the connection on the user's computer, the lobby server application invokes the RemoteConnect function of the connectivity API on the computer hosting the lobby server application (442). In response, the connectivity API on the lobby server sends a system message to the connectivity object on the client (444). This system message includes a connectivity address with address information identifying the service provider, the telephone number of the game server, and call control data (COM port, baud rate, no. of stop bits, parity and flow control). The message also includes the application identifier of the game. In response to receiving this message, the connectivity object on the user's computer saves the state information of the current connection (446), and creates a connectivity object on behalf of the game application (448). In creating the connectivity object for the game application, the connectivity API initializes the service provider identified in the connectivity address provided in the system message (450). The connectivity API then connects the game application to a session using the Open function on the connectivity object (452). Preferably, the connectivity API only connects the game application to the session if the game application has the focus, meaning that the main window of the game application in the windowing interface of the Windows operating system is active and responsive to user input.

It is important to emphasize that the service provider (sp. 2) used to connect to the game server is likely to be different than the service provider (sp. 1) used to connect to the lobby server. To improve game performance, the service provider used to connect to the game session will use a different protocol than TCP/IP. The protocol that the service provider uses for the game session does not have to have any address header and this helps to maximize the amount of bandwidth for application data.

When the user's game application is connected to a session, the user can engage in the multi-player game against other users connected to the session. The above process can be repeated for each of the participants in the game session.

As illustrated in FIG. 4C, the game application on the game server is connected to the game session via the connectivity API and service provider. The connectivity API and service provider on the game server enable the game application to communicate with the client computers involved in the session in the same manner that they communicate with it. Specifically, each of the participating applications communicate using the send/receive communication model explained above.

The connectivity API enables an application to restore the state of a user's connection when the game application is no longer participating in the game session. Specifically, the host game application on the server can invoke the RestoreConnection function to restore the connection of a user's computer. FIG. 7 is a block diagram continuing the example of FIGS. 6A and 6B. FIG. 7 shows the operations of the client (the game application and connectivity API) on the left, and the operations of the game server (the game server application and the connectivity API of the game server) on the right. As in FIG. 6A, the dashed line represents the communication medium, including the physical connection between the computers and the service providers on each computer. In this case, the service providers used to communicate between the connectivity APIs an each computer are service providers that implement a communication protocol optimized for the game application. The messages passed between the game applications in the session require little or no header for message routing purposes because they are dedicated to the game application. In addition, the physical connection between the game server and the client is preferably a direct modem-to-modem serial connection, as opposed to the slower TCP/IP connection between the client and lobby server on the Internet.

The service provider in use on the client computer is the one that was initialized in block 450 of FIG. 6A. The game server also has a version of the same service provider to pass messages to the client on the serial communication link.

During the game, the game application and the game server communicate by invoking the send and receive functions of the connectivity API. In response to the send function, the connectivity API calls the send function of the service provider to instruct it to send the message. Preferably, the service provider sends the message without adding any data (e.g., a header for routing purposes). In response to the receive function, the connectivity API retrieves messages queued for the application. FIG. 7 generally shows the interaction between the connectivity APIs during normal game play. Block 460 represents calls from the client game application to the connectivity API on the client, and block 462 represents operations of the connectivity API. Similarly, block 464 represents calls from the game server application to the connectivity API, and block 466 represents operations of the connectivity API on the server.

When the client game application terminates, the connectivity API sends a message to the game server indicating that the client application has entered a shut-down process. At this point, the game server can invoke the RestoreConnection function on its connectivity API to restore the previous connection on the client (468). In response to this function call on the game server computer, the connectivity API sends a system message to the connectivity object on the client computer (470). The client connectivity object then uses the state information that it has stored in an MRU list to restore the state of the connection. Specifically, it takes the connectivity address stored in response to the RemoteConnect function from the MRU stack (472), shuts down the current service provider (sp. 2) (474), and creates a new connectivity object (476). In creating the connectivity object, it initializes the service provider (sp. 1) from the previous connection (478). In this particular example of a lobby on the Internet, the connectivity address includes the service provider GUIDE, the application GUIDE of the lobby client, the telephone number of the Internet service provider. and the URL of the lobby. Finally, the connectivity API posts a message for the lobby client to provide it with a pointer to the new connectivity object established for the TCP/IP connection (480). Thus, when the lobby client regains the focus, its connection with the lobby server on the Internet has been restored.

The connectivity API also includes code to restore the state of a previous connection when a game application loses the focus or terminates. This is implemented as a user-settable option in the connectivity API that the game application program can expose to the user in the form of a dialog box. The user can set the connectivity API to restore the state of a previous connection when the application program terminates, loses the focus, or loses the focus and some specified period of time elapses after loss of the focus.

If the user enables the feature for restoring upon loss of focus, the connectivity API monitors the state of the focus in the operating system. In the implementation for the Windows Operating System, the connectivity API determines whether the application program has the focus through its window handle, which is an identifier referring to an application program's user interface window. Using window handles, the connectivity API monitors for changes in focus by intercepting messages from the operating system destined for an application's window (482). The connectivity API hooks messages corresponding to user input from the operating system to the application's window (484). These messages indicate which application is active and currently responsive to user input. An alternative way of monitoring for changes in focus is to use operating system services of the Windows Operating System, namely a shell hook, to receive notifications about changes in focus from one application to another.

The process of monitoring for termination of the application is similar in that the operating system signals an event indicating that the application has terminated or failed. The connectivity API monitors for this event hooking messages from the operating system.

When the connectivity API detects that the game application has lost the focus or is terminated (and the restore option is enabled), it will restore the state of the previous connection, which it has stored in a most-recently-used stack (MRU) (See blocks 472–480 in FIG. 7). If the user has selected to only restore the previous connection after a specified period of time, the connectivity API activates a timer to keep track of the elapsed time after the application loses the focus. Then, if the application should regain the focus before the timer reaches the specified time, the timer is reset. Otherwise, if the timer reaches the-specified time, then the-onnectivity API proceeds to restore the previous connection, using the connectivity address stored in the MRU stack.

One specific example of the lobby client in the above-scenario is an Internet browser accessing a lobby server at a Web site on the Internet. In this example, the lobby client is the Internet browser, and the lobby is implemented at a Web server on the Internet. The browser creates a lobby object and a connectivity object so that its counterpart connectivity object running on the Web server can communicate with it via the message model of the connectivity API. Specifically, the browser needs to create a connectivity object on the client so that the lobby server can invoke functions of the connectivity API remotely.

The lobby server application can also be implemented on a web page using a scripting language like Visual Basic Script from Microsoft Corp. One possible implementation is to implement the connectivity object of the lobby server as an ActiveX control and the lobby itself as a Web page stored on the Web server. The ActiveX control is a program module (either a dynamic linked library or executable program) implemented to comply with the Component Object Model (COM) specification. This control is installed on the client computer and activated when the browser renders the Web page of the lobby, downloaded from the Web server. Specifically, when the browser renders the page, it finds a reference (e.g., an object tag) to the ActiveX control and loads the control.

The interaction between the server connectivity object (the ActiveX control) and the client connectivity object occurs when the browser executes the script in the lobby web page. When the user selects a game application on the web page, for example, the browser executes the script code that invokes the RemoteConnect function through the Active X control interface. In turn, the ActiveX control on the client sends a system message to the client connectivity object. The client connectivity object then handles the switching of protocols as described above and illustrated in FIG. 6B.

Connectivity Object Structures and Functions

The following sections provide implementation guidelines for the functions and data structures listed above.
DPSESSIONDESC2
This is a data structure that contains a description of a session.

```
typedef struct {
    DWORD    dwSize;
    DWORD    dwFlags;
    GUID     guidInstance;
    GUID     guidApplication;
    DWORD    dwMaxPlayers;
    DWORD    dwCurrentPlayers;
    union {
        LPWSTR   lpszSessionName;
        LPSTR    lpszSessionNameA;
    };
    union {
        LPWSTR   lpszPassword;
        LPSTR    lpszPasswordA;
    };
    DWORD    dwReserved1;
    DWORD    dwReserved2;
    DWORD    dwUser1;
    DWORD    dwUser2;
    DWORD    dwUser3;
    DWORD    dwUser4;
} DPSESSIONDESC2, FAR *LPDPSESSIONDESC2;
``` dwSize
Size, in bytes, of this structure. Must be initialized before the structure is used.
dwFlags
A combination of the following flags. These flags can be changed once a session has started using SetSessionDesc.
DPSESSION_NEWPLAYERSDISABLED Indictes that new players cannot be created in the session. Any call to CreatePlayer by an application in the session will result in an error. It also means that new applications cannot join the session. If this flag is not specified player can be created until the session player limit is reached.
DPSESSION_MIGRATEHOST If the current host exits, the host will attempt to migrate to another machine so that new players may continue to join. If this flag is not specified the host will not migrate and new players cannot be created.
DPSESSION_NOMESSAGEID Do not attach data to messages indicating who the message is from and who it is to. Saves message overhead if this information is not relevant. (See Receive). If this flag is not specified the message ID will be added.
DPSESSION_KEEPALIVE Automatically detect when remote players drop out of the game abnormally. Those players will be deleted from the session. If the loss of the players was due to a temporary network outage, when they returns, those players will be informed that they were dropped from the session. See DPSYS_SESSIONLOST. If this flag is rot specified, Direct play will not do any automatic keepalive.

DPSESSION_NODATAMESSAGES Do not send system messages when remote player or group data changes using SetPlayerData, SetGroupData, SetPlayerName or SetGroupName. If this flag is not specified, data changed messages will be generated.

DPSESSION_JOINDISABLED No new applications can join this session. Any call to Open using the DPOPEN_JOIN flag and the guidInstance of this session will result in an error. If this flag is not specified new remote applications can join the session until the session player limit is reached.

guidInstance
Globally unique identifier (GUIDE) of the session instance.

guidApplication
Globally unique identifier (GUIDE) for the application running in the session instance. It uniquely identifies the application so that Direct play connects only to other machines running the same app. If guidapplication may be set to GUIDE_NULL in order to enumerate sessions for any application.

dwMaxPlayers
Maximum number of players allowed in this session.

dwCurrentPlayers
Number of current players in the session.

lpszSessionName, lpszPassword
Pointers to Unicode string containing the name and password of the session. Only use these members if the IDirectPlay2 interface is being used.

lpszSessionNameA, lpszPasswordA
Pointers to ANSI string containing the name and password of the session. Only use these members if the IDirectPlay2A interface is being used.

dwReserved1, dwReserved2
Reserved for future use.

dwUser1, dwUser2, dwUser3, dwUser4
Application specific data for the session.

RemoteConnect
This method is called to change the protocol and address that a remote client is using to communicate.
    HRESULT RemoteConnect(
        LPGUID lpguidNewSP,
        LPCVOID lpDpAddress,
        DWORD dwDpAddress Size)

Parameters
lpguidNewSP
Pointer to the GUIDE representing the service provider to be switched to.

lpDpAddress
Pointer to the start of the Direct play address buffer, representing the new address to be switched to. This address is in the context of the service provider specified by lpguidNewSp.

dwDpAddressSize
The size, in bytes, of the address data.

Returns
    DP_OK
    DPERR_INVALID OBJECT
    DPERR_INVALID PARAMS
    DPERR_UNAVAILABLE
    DPERR_GENERIC
    DPERR_EXCEPTION RestoreConnection
This function is called to restore the original connection after it has been changed successfully with a RemoteConnect call.
    HRESULT RestoreConnection(void)

Returns
    DP_OK
    DPERR_INVALID OBJECT
    DPERR_NOTHING TO RESTORE
    DPERR_EXCEPTION DirectPlayCreate
This API is used to create an instance of a connectivity object. It attempts to initialize a connectivity object and sets a pointer to it if it was successful. Calling the member function DirectPlayEnumerate immediately before initialization is advised to determine what types of service providers are available.
    HRESULT DirectPlayCreate(
        LPGUID lpguidSP,
        LPDIRECTPLAY FAR *lpIPIPDP,
        lunknown FAR *lpUnk)

Parameters
lpguidSP
Pointer to the GUIDE representing the service provider that should be created. Obtain the GUIDE using DirectPlayEnumerate.

lplpDP
Pointer to a pointer to be initialized with a valid IDirectPlay interface. The application will need to use the QueryInterface method to obtain an IDirectPlay2 (UNICODE strings) or IDirectPlay2A (ANSI strings) interface.

lpUnk
Pointer to the containing Unkown. This parameter is provided for future compability with COM aggregation features. Presently, however, DirectPlayCreate will return an error if it is anything but NIJLL.

Return Values

| DP_OK | DPERR_GENERIC |
|---|---|
| DPERR_EXCEPTION | DPERR_UNAVAILABLE |

Comments
After calling this function, the app will need to call QueryInterface to obtain a pointer to the IDirectPlay2 or IDirectPlay2A interface.

DirectPlayEnumerate
Enumerate the Direct play service providers installed on the system.
    HRESULT DirectPlayEnumerate(
        LPDPENUMCALLBACK lpCallback,
        LPVOID lpContext)

Parameters
lpCallback
Pointer to a callback function that will be called with a description of each service provider interface installed in the system. Depending on whether UNICODE is defmed or not, the prototype for the callback function will have lpFriendlyName defined as a LPWSTR (for Unicode) or LPSTR (for ANSI).
    BOOL Callback(
        LPGUID lpguidSP,
        LPSTR/LPWSTR lpSPName,
        DWORD dwMajorVersion, DWORD dwMinorVersion,
    LPVOID lpContext)
lpguidSP
    Pointer to the unique identifier of the Direct play service provider.
lpSPName
    Pointer to a string containing the driver description. Depending on whether the UNICODE symbol is defined or not, this parameter will be LPWSTR (Unicode) or LPSTR (ANSI).
dwMajorVersion
    Major version number of the driver.
dwMinorVersion
    Minor version number of the driver.
lpContext
    Pointer to a caller-defined context.
Return Value
    TRUE Continue the enumeration
    FALSE Stop the enumeration
Callback Comments
    Note that any pointers returned in a callback function are temporary are only valid in the body of the callback function. If the application wants to save pointer information, it needs to allocate memory to hold the data, copy the data and then store the pointer to this new data. In this function lpguidSP and lpSPName are temporary.
lpContext
    Points to a caller-defined context that will be passed to the enumeration callback each time it is called.
Return Values

| DP_OK | DPERR_EXCEPTION |
| DPERR_GENERIC | |

Comments
    This will enumerate service providers installed in the system even though the system may not be capable of using those service providers. E.g. a TAPI service provider will be part of the enumeration even though the system may not have a modem installed.
Open
    This function establishes a gaming session instance. An application may either create a new session (which other remote applications join) or join an existing session. Open must be called before any local players are created. Before an application can join an existing session, it will use EnumSessions to obtain a list of what sessions can be joined and their session descriptions. Attempting to join a session where new players are disabled, joining is disabled, an incorrect password is supplied or the planer limit has been reached will result in a DPERR_UNAVAILABLE error.
        HRESULT Open(
            LPDIRECTPLAY lpDirectPlay,
            DWORD dwFlags,
            LPDPSESSIONDESC2 lpsd)
Parameters
lpDirectPlay
    Pointer to the Direct play object.
dwFlags
    One of the following flags must be specified.
    DPOPEN_CREATE Create a new instance of a gaming session
    DPOPEN_JOIN Join an existing instance of a gaming session
lpsd
    Points to the DPSESSIONDESC structure describing the session to be created or joined.
Return Values

| DP OK | DPERR_INVALIDOBJECT |
| DPERR_INVALIDPARAMS | DPERR_GENERIC |
| DPERR_UNAVAILABLE | DPERR_UNSUPPORTED |
| DPERR_USERCANCEL | DPERR_ACTIVEPLAYERS |
| DPERR_INVALIDFLAGS | ✓DPERR_ALREADYINITIALIZED |

Close
    This method closes a previously opened session. All locally created players will be destroyed, with corresponding DPSYS_DELETEPLAYER system messages sent to other session participants.
        HRESULT Close(
            LPDIRECTPLAY lpDirectPlay)
Parameters
lpDirectPlay
    Pointer to the Direct play object.
Return Values

| DP_OK | DPERR_INVALIDOBJECT |
| DPERR_INVALIDPARAMS | ✓VDPERR_NOSESSIONS |

EnumSessions
    This method is used to enumerate the sessions available to this connectivity object. EnumSessions is usually called immediately after the connectivity object is created using DirectPlayCreate. It cannot be called while connected to a session or after an application has created a session. EnumSessions works by asking the service provider to locate one or more session hosts on the network and send them an enumeration request. The replies received make up the sessions that are enumerated. The amount of time this function spends listening for these replies is controlled by the dwTimeout parameter. When this time interval has expired, the callback will be notified using the DPESC_TIMEDOUT flag. and a NULL will be passed for lpThisSD. At this point, you may choose to continue the enumeration by resetting *lpdwTimeOut to a new value and returning TRUE, or returning FALSE to end the enumeration. It is recommeded that dwTimeout be set to 0. In that case the function will compute a timeout that is appropriate for the service provider.
    Normally only sessions that can be joined are enumerated. If the DPENUMSESSIONS_ALL flag is specified, sessions will be enumerated even if the creation of new players has been disabled or if the session is private sessions. Note the application will still not be able to join these sessions.
    If the application was not launched by a lobby, the service provider may display a dialog to obtain information from the user in order to perform the enumeration. For example, the serial service provider will ask for COM Port settings, the modem service provider will ask for a phone number, the Internet service provider will ask for an IP address of the host.
        HRESULT EnumSessions(
            LPDIRECTPLAY lpDirectPlay,
            LPCDPSESSIONDESC2 lpsd,
            DWORD dwTimeout,
            LPDPENUMSESSIONSCALLBACK2 lpEnumCallback,
            LPVOID lpContext, DWORD dwFlags)
Parameters
lpDirectPlay
   Pointer to the connectivity object.
lpsd
   Points to a constant DPSESSIONDESC2 structure describing the sessions to be enumerated. Only those sessions that meet the criteria set in this structure will be enumerated. guidApplication should be set to the GUIDE of the specific application of interest or NULL for all applications. guidInstance may be set to a specific GUIDE of a session instance if it is known otherwise it should be set to NULL to obtain all sessions. If the DPENUMSESSIONS_AVAILABLE flag is going to be used with a password, then lpszpassword should be set accordingly.
dwTimeout
   A timeout value in milliseconds. This value is the total amount of time that the function will wait for replies to the enumeration message (not the time between enumerations). It is recommended that this be set to zero so the function can compute a default timeout appropriate for the service provider.
lpEnumCallback
   Points to the function which will be called for each Direct play session responding.
     BOOL WINAPI EnumSessionCallback(
       LPCDPSESSIONDESC2 lpThisSD,
       LPDWORD lpdwTimeOut,
       DWORD dwFlags,
       LPVOID lpContext)
lpThisSD
   Pointer to a DPSESSIONDESC2 structure describing the enumerated session. Will be set to NULL if the enumeration has timed out.
lpdwTimeOut
   Pointer to a DWORD containing the current timeout value. This can be reset when the DPESC_TIMEOUT flag is returned if you want to wait longer for sessions to reply.
dwFlags
   Normally, this flag is zero.
   DPESC_TIMEDOUT The enumeration has timed out Reset *lpdwTimeOut and return TRUE to continue, or FALSE to stop the enumeration
lpContext
   Pointer to a caller-defined context.
Return Value

| TRUE | Continue the enumeration |
| FALSE | Stop the enumeration |

Callback Comments
   Note that any pointers returned in a callback function are temporary are only valid in the body of the callback function. If the application wants to save pointer information, it needs to allocate memory to hold the data, copy the data and then store the pointer to this new data. In this function lpThisSD are temporary. Also note that the pointers inside the lpThisSD structure, lpszSessionName (lpszSessionNameA and lpsZPassword/lpszPasswordA are also temporary.
lpContext
   Points to a user-defined context that is passed to each enumeration callback.
dwFlags
   If dwFlags=0, only the available sessions will be enumerated (DPENUMSESSIONS_AVAILABLE)
   DPENUMSESSIONS_AVAILABLE Enumerate all sessions with a matching password (if provided), that is allowing new applications to join.
   DPENUMSESSIONS_ALL Enumerate all active sessions, whether they are available to join or not. Sessions the player limit has been reached, new players have been disabled, or joining has been disabled will be enumerated. The application may examine the dwFlags member of this structure to determine if the session will allow new applications to join or not. Note: need to also enumerate sessions which are password protected.
Return Values

| DP_OK | DPERR_INVALIDOBJECT |
| DPERR_INVALIDPARAMS | DPERR_EXCEPTION |

Comments
   DPENUMSESSION_PREVIOUS is obsolete.
   DPERR_EXCEPTION—A session is already open.
   If the session has a password, it won't be returned in the EnumSessionCallback will it?
GetCaps
   This method returns the capabilities of this connectivity object. The difference between this function and GetPlayerCaps is that an average latency will be computed, if supported by the service provider.
     HRESULT GetCaps(
       LPDIRECTPLAY lpDirectPlay,
       DWORD dwFlags,
       LPDPCAPS lpDPCaps)
Parameters
lpDirectPlay
   Pointer to the connectivity object.
dwFlags
   If dwFlags=0, the latency will be computed for non-guaranteed messaging.
   DPGETCAPS_GUARANTEED get latency for a guaranteed message delivery
lpDPCaps
   Pointer to a DPCAPS structure which will be filled in with the capabilities. If the service provider cannot compute the latency, it will be set to zero.
Return Values

| DP_OK | DPERR_INVALIDOBJECT |
| DPERR_INVALIDPARAMS | |

Comment
   If the application has set all messages to be sent guaranteed by default, then this function needs to compute the latency using guaranteed messaging.
Receive
   This method is used to retrieve a message from the message queue. Messages received from Player ID zero are system messages generated by the session host. In those cases the lpData of system messages should be cast to DPMSG_GENERIC and the dwType data member examined to see what specific system message it is.
   Messages that were sent to Player ID zero as a way to broadcast them to all players or to a Group ID to send them all the players in the group still appear to come from the sending Player ID. An application will only receive messages directed to a local player. A player cannot receive a message where idFrom ==idTo.

If DPSESSION_NOMESSAGEID is specified in the session description, the player that it is send to and who it comes from are meaningless.

All the service providers perform integrity checks on the data to protect against corruption. Any message received will be verified and if data corruption is detected it will either be thrown away (if it was sent non-guaranteed) or it will be retransmitted (if it was sent guaranteed)

```
HRESULT Receive(
    LPDIRECTPLAY IpDirectPlay,
    LPDPID IpidFrom,
    LPDPID IpidTo,
    DWORD dwFlags,
    LPVOID IpData,
    LPDWORD lpdwDataSize)
```

Parameters lpDirectPlay
  Pointer to the connectivity object.
IpidFrom
  Pointer to a DPID which will be set to the Player ID that the message came from when the function returns. If the DPRECEIVE_FROMPLAYER flag is specified, then this DPID must be initialized with the Player ID before calling the function.
lpidTo
  Pointer to a DPID which will be set to the Player ID that the message is directed to when the function returns. If the DPRECEIVE_TOPLAYER flag is specified, then this DPID must be initialized with the Player ID before calling the function.
dwFlags
  One or more of the following flags. Both DPRECEIVE_TOPLAYER and DPRECEIVE_FROMPLAYER may be specified, in which case Receive will return whichever message is encountered first.
    DPRECEIVE_ALL Return the first available message. This is the default
    DPRECEIVE_TOPLAYER Return the first message intended for the Player ID pointed to by IpidTo.
    DPRECEIVE_FROMPLAYER Return the first message from the Player ID pointed to by lpidFrom. System message come from Player ID zero.
    DPRECEIVE_PEFEK Return a message as specified by the other flags, but do not remove it from the message queue. This flags must be specified if IpData is NULL.
IpData
  A pointer to a buffer where the message data is to be written. Passing NULL means that only the size of the data is being requested. *IpdwDataSize will be set to size required to hold the data. If the message came from Player ID DPID_SYSMSG, the application should cast IpData to DPMSG_GENERIC and check the dwType member to see what type of system message it is before processing it.
lpdwDataSize
  Pointer to a DWORD which is initialized to size of the buffer before calling the function. After the fiction returns it will be set to the size, in bytes, of the group data. If the buffer was too small (DPERR_BUFFERTOOSMALL), then this will be set to the buffer size required. The message order in the receive queue may change between calls to Receive. Therefore, it is possible to get a DPERR_BUFFERTOOSMALL error again even after the application has allocated the memory requested from the previous call to Receive. It is best keep re-allocating memory in a while loop until a DPERR_BUFFERTOOSMALL error is not received.

Return Values

| DP_OK | DPERR_INVALIDOBJECT |
| DPERR_INVALIDPARAMS | DPERR_BUFFERTOOSMALL |
| ✓DPERR_NOMESSAGES | DPERR_GENERIC |
| DPERR_INVALIDPLAYER | |

Comments
  The reason for forcing the app to specify DPRECEIVE_PEEK when IpData is NULL is so that it is obvious that the message will not be removed from the message queue. If this is not done, return DPERR_INVALIDPARAMS.
Send
  This method is used to send a message to another player, to a group of players, or to all the players in the session. To send a message to another player, specify the target player's Player ID. To send a message to a group of players, send the message to the Group ID assigned to the group. To send a message to the entire session, send the message to Player ID DPID_ALLPLAYERS.

A player cannot send a message to itself. If a player sends a message to a group that it is a part of or to DPID_ALLPLAYERS, it will not receive a copy of that message.

If DPSESSION_NOMESSAGEID was specified in the session description, then it is possible for a player to receive a message that it sent to a group. Since there is no Direct play message ID header on the message (indicating who sent the message) it cannot filter out messages from itself when the service provider implements group sends; the application will need to be able to evaluate this based on the content of the message. When DPSESSION_NOMESSAGEID is used, the message is sent to one of the local players on the target machine. The player from will be 0xFFFFFFFF.

Messages can be sent guaranteed or non-guaranteed. By default, messages are sent non-guaranteed which means that this function does no verification that the message reached the indented recipient. Sending a guaranteed message takes much longer; a minimum or 2 to 3 times longer than a non-guaranteed message. Applications should try to minimize sending guaranteed messages as much as possible and design the application to tolerate lost messages.

All the service providers perform integrity checks on the data to protect against corruption. Any message Received will be verified and if data corruption is detected it will either be thrown away (if it was sent non-guaranteed) or it will be retransmitted (if it was sent guaranteed).

```
HRESULT Send(
    LPDIRECTPLAY IpDirectPlay,
    DPID idFrom,
    DPID idTo,
    DWORD dwFlags,
    LPVOID IpData,
    DWORD dwDataSize)
```

Parameters
lpDirectPlay
  Pointer to the connectivity object.
idFrom
  The Player ID of the sending player. The Player ID must correspond to one of the local players on this machine.
idTo
  The Player ID of the player to send the message to, the Group ID of the group of players to send the message to, or zero to send to all players in the session. If DPSEND_OPENSTREAM or DPSEND_CLOSESTREAM flags are used, then this MUST be a Player ID.
dwFlags The flags indicating how the message should be sent. If dwFlags=0, the message is sent non-guaranteed. DPSEND_OPENSTREAM and DPSEND_CLOSESTREAM are used to let Direct play and the service provider know that there will be a large number of guaranteed messages being send to player idTo. If some efficiency can be gained by not having to open and close a guaranteed communication pipe (stream) for each message to that player, then the service provider may leave the stream open until a Send with DPSEND_CLOSESTREAM for that Player ID is called. DPSEND_OPENSTREAM and DPSEND_CLOSESTREAM is only valid for messages where idTo is a valid Player ID. It is not required that a service provider support DPSEND_OPENSTREAM and DPSEND_CLOSESTREAM.

DPSEND_GUARANTEED Send the message using a guaranteed method of delivery if it is available.

DPSEND_OPENSTREAM Optimization hint to the service provider that there will be a lot guaranteed messages being sent to this player.

DPSEND_CLOSESTREAM There will no longer be a lot of guaranteed messages being sent to this player.

lpData

Pointer to the data being sent. NULL if there is no actual message to send. An application may do this if the DPSEND_OPENSTREAM or DPSEND_CLOSESTREAM flags are specified.

dwDataSize

The length of the data being sent.

Return Values

Send will either return a code as summarized below or the number of messages queued for transmission in Direct play's internal queue.

| DP_OK | DPERR_INVALIDPLAYER |
|---|---|
| DPERR_INVALIDOBJECT | DPERR_INVALIDPARAMS |
| DPERR_BUSY | ✓DPERR_SENDTOOBIG |

Comments

Messages sent to ID zero or to a Group ID are sent to each individual player and appear as if they came directly from the sending player. An application can specify a NULL lpData if it just wishes to open or close a stream to a specific player.

DPERR_INVALIDPLAYER error is idTo is a group or zero with DPSEND_OPENSTREAM or DPSEND_CLOSESTREAM. Remove DPSEND_HIGHPRIORITY.

GetMessageCount

This member returns the number of messages queued for a specific local player.

HRESULT GetMessageCount(
    LPDIRECTPLAY lpDirectPlay,
    DPID idPlayer,
    LPDWORD lpdwCount)

Parameters lpDirectPlay

Pointer to the Direct play object.

idplayer

Player ID that the message count is being requested for. Must be a local player lpdwCount Points to a DWORD that will be set to the message count when the function returns.

Return Values

| DP_OK | DPERR_INVALIDOBJECT |
|---|---|
| DPERR_INVALIDPARAMS | DPERR_INVALIDPLAYER |

Comment

Return DPERR_INVALIDPARAMS if lpdwCount is NULL.

Create Player

This method is used to create a local player for the current session. A single application may have multiple local players which can communicate through a Direct play object with any number of other local or remote players running on multiple computers. The Player ID returned to the caller should be used to identify the player for message passing and data association. Player and Group IDs assigned by Direct play will always be unique within the session.

The application can associate an initial name with the player at creation (see SetPlayerName). The names in lpPlayerName are provided for human use only, they are not used internally and need not be unique. The application may also associate initial data with the player at creation (see SetPlayerData).

This function, upon successful completion, sends a DPSYS_CREATEPLAYERORGROUPsystem message to all of the other players in the session announcing that a new player has joined the session. The newly created player can use the EnumPlayers method to find out who else is in the session.

It is highly recommended that an application provide a non-NULL hEvent and use this event for synchronization. After the creation of a player, use Wait For Single Object (*lpEvent, dwTimeout=0) within a separate process thread to determine if a player has messages (the return value will be WAIT_TIMEOUT if there aren't any waiting messages) or use a different timeout to wait for a message to come in. It is inefficient to spin on Receive.

HRESULT CreatePlayer(
    LPDIRECTPLAY lpDirectPlay,
    LPDPID lpidPlayer,
    LPDPNAME lpPlayerName,
    HANDLE hEvent,
    LPVOID lpData,
    DWORD dwDataSize,
    DWORD dwFlags)

Parameters lpDirectPlay

Pointer to the Direct play object.

lpidPlayer

Pointer to the DPID that will be filled in with the Direct play Player ID.

lpPlayerName

Pointer to a DPNAME structure which holds the name of the player. NULL indicates that the player has no initial name information.

hEvent

An event object created by the application which will be triggered by Direct play when a message addressed to this player is received.

lpData

Pointer to a block of application defined data to associate with the Player ID. NULL indicates that the player has no initial data. The data specified here is assumed to be remote data which as ill be propagated to all the other applications in the sessions as if SetPlayerData were called.

dwDataSize
   The size, in bytes, of the data block that lpData points to.
dwFlags
   This is not used at this time.
Return Values
   DP_OK  DPERR_CANTCREATEPLAYER
   DPERR_NOCONNECTION    DPERR_CANTADDPLAYER
   DPERR_INVALIDOBJECT    DPERR_INVALIDPARAMS
   DPERR_GENERIC DeletePlayerFromGroup
   This method removes a player from a group. A DPSYS_DELETEPLAYERFROMGRP system message is generated to inform the other players of the change.
       HRESULT DeletePlayerFromGroup(
          LPDIRECTPLAY lpDirectPlay,
          DPID idGroup,
          DPID idplayer)
   Parameters
   lpDirectPlay
       Pointer to the Direct play object.
   idGroup
       Group ID of the group to be adjusted.
   idPlayer
       Player ID of the player to be removed from group.
   Return Values

| DP_OK | DPERR_INVALIDOBJECT |
| DPERR_INVALIDPLAYER | DPERR_INVALIDGROUP |

DestroyGroup
   This method deletes a group from the session. The ID belonging to the group will not be reused during the current session. It is not necessary to empty a group before deleting it. The individual players belonging to the group are not destroyed. This method will generate a DPSYS_DELETEPLAYERFROMGROUP for each player in the group and then a DPSYS_DELETEGROUP system message.
       HRESULT DestroyGroup(
          LPDIRECTPLAY lpDirectPlay,
          DPID idGroup)
   Parameters
   lpDirectPlay
       Pointer to the Direct play object.
   idGroup
       The ID of the group that is being removed from the session.
   Return Values

| DP_OK | DPERR_INVALIDOBJECT |
| DPERR_INVALIDPLAYER | |

DestroyPlayer
   This member deletes a player from the session, removes any pending messages destined for that player from the message queue, and removes the player from any groups to which it belonged. The Player ID will not be reused during the current session. This method will generate a DPSYS_DELETEPLAYERFROMGROUP message for each group that the player belongs to and then a DPSYS_DELETEPLAYER system message.

HRESULT DestroyPlayer(
          LPDIRECTPLAY lpDirectPlay,
          DPID idPlayer)
   Parameters
   lpDirectPlay
       Pointer to the Direct play object.
   idPlayer
       The Player ID of the player that is being removed from the session.
   Return Values

| DP_OK | DPERR_INVALIDOBJECT |
| DPERR_INVALIDPLAYER | |

EnumGroups
   This function is used to enumerate the groups available to a session. By default, the member will enumerate using the local player list for the current session. The DPENUMPLAYERS_SESSION flag can be used, along with a session instance (GUID, to request a session's host to provide its list for enumeration. EnumGroups cannot be calledfrom within an EnunSessions enumeration. Furthermore, use of the DPENUMPLAYERS_SESSION flag with this function must occur after a call to EnumSessions and before any calls to Close or Open.
       HRESULT EnumGroups(
          LPDIRECTPLAY lpDirectPlay,
          LPGUID lpguidinstance,
          LPDPENUMPLAYERSCALLBACK2 lpEnumCallback,
          LPVOID lpContext,
          DWORD dwFlags)
   Parameters
   lpDirectPlay
       Pointer to the Direct play object.
   lpguidInstance
       The Direct play session instance of interest. Used only if the DPENUMPLAYERS_SESSION flag is specified.
   lpEnumCallback
       Points to the function which will be called for every group in the session. Note that the same callback function prototype is used for EnumPlayers and EnumGroupPlayers.
       BOOL WINAPI EnumCallback(
          DPID dpid,
          DWORD dwPlayerType,
          LPCDPNAME lpName,
          DWORD dwFlags,
          LPVOID lpContext)
   dpid
       The Group ID of the group being enumerated.
   dwPlayerType
       What type of player is this is. DPPLAYERTYPE_GROUP or DPPLAYERTYPE_PLAYER
   lpName
       Pointer to a constant DPNAME structure containing the name of the player or group.
   dwFlags
       The flags that were passed in to the EnumGroups method.
   lpContext
       Points to a caller-defined context.
   Return Value
       TRUE—Continue the enumeration
       FALSE—Stop the enumeration
   Callback Comments
       Note that any pointers returned in a callback function are temporary are only valid in the body of the callback function. If the application wants to save pointer information, it needs to allocate memory to hold the data, copy the data and then store the pointer to this new data. In this function lpName and lpData are temporaly. Also note that the pointers inside the lpName structure, lpszShortName/lpsz short, NameA and lpszLongName/lpszLongNameA are also temporary.

lpContext
    Pointer to a caller-defmed context that is passed to each enumeration callback.
dwFlags
    These flags will be passed in the dwFlags parameter to the callback function.
DPENUMGROUPS_SESSION
    Enumerate the groups in the session identified by lpguidlnstance
Return Values

| DP_OK | DPERR_INVALIDOBJECT |
| DPERR_INVALIDPARAMS | DPERR_UNSUPPORTED |

Comments
    What do those flags in the callback function mean? Note the change in the order of the parameters in the callback function.

EnumGroupPlayers
    This function is used to enumerate all of the members of a particular group existing in the current session.
    HRESULT EnumGroupPlayers(
        LPDIRECTPLAY lpDirectPlay,
        DPID idGroup,
        LPGUID lpguidinstance,
        LPDPENUMPLAYERSCALLBACK2
            lpEnumCallback,
        LPVOID lpContext,
        DWORD dwFlags)
Parameters
lpDirectPlay
    Pointer to the Direct play object.
idGroup
    The Group ID whose players are to be enumerated.
lpguidlnstance
    The Direct play session instance of interest. Used only if the DPENUMPLAYERS_SESSICN flag is specified.
lpEnumCallback
    Pointer to the callback function which will be called for every player in the group. See EnumGroups for the definition of the callback function and its parameters.
lpContext
    Pointer to a caller-defmed context that is passed to each enumeration callback.
dwFlags
    These flags will be passed in the dwFlags parameter to the callback function.
DPENUMGROUPS_SESSION
    Enumerate the players in the group in the session identified by lpguidlnstance
Return Values

| DP_OK | DPERR_INVALIDOBJECT |
| DPERR_INVALIDFLAGS | DPERR_EXCEPTION |
| DPERR_INVALIDPLAYER | |

EnumPlayers
    This method is used to enumerate the players in session. By default, the method will enumerate players in the current open session. Groups can also be included in the enumeration by using the DPENUMPLAYERS_GROUP flag. The DPENUMPLAYERS_SESSION flag can be used, along with a session instance GUIDE, to request a session's host to provide its list for enumeration. EnumGroups cannot be calledfrom within an EnumSessions enumeration. Furthermore, use of the DPENUMPLAYERS_SESSION flag with this function must occur after a call to EnumSession and before any calls to Close or Open.
    HRESULT EnumPlayers(
        LPDIRECTPLAY lpDirectPlay,
        LPGUID lpguidinstance,
        LPDPENUMPLAYERSCALLBACK2
            lpEnumCallback,
        LPVOID lpContext,
        DWORD dwFlags)
Parameters
lpDirectPlay
    Pointer to the Direct play object.
lpguidlnstance
    The Direct play session instance of interest. Used only if the DPENUMPLAYERS_SESSION flag is specified.
lpEnumCallback
    Points to the function which will be called for every group in the session. Note that the same callback function prototype is used for EnumGroups and EnumGroupPlayers.
lpContext
    Pointer to a caller-defmed context that is passed to each enumeration callback.
dwFlags
    These flags will be passed in the dwFlags parameter to the callback function.
DPENUMPLAYERS_LOCAL
    Enumerate only those players that were created locally by this Direct play object
DPENUMPLAYERS_REMOTE
    Enumerate only those players that were created by remote Direct play objects
DPENUMPLAYERS_GROUP
    Include groups in the enumeration of players.
DPENUMPLAYERS_SESSION
    Enumerate the players for the session identified by lpguidlnstance
Return Values

| DP_OK | DPERR_INVALIDOBJECT |
| DPERR_GENERIC | DPERR_UNSUPPORTED |
| DPERR_EXCEPTION | |

GetMessageCount
    This member returns the number of messages queued for a specific local player.
    HRESULT GetMessageCount(
        LPDIRECTPLAY lpDirectPlay,
        DPID idPlayer,
        LPDWORD lpdwCount)
Parameters
lpDirectPlay
    Pointer to the Direct play object.
idPlayer
    Player ID that the message count is being requested for. Must be a local player lpdwCount
    Points to a DWORD that will be set to the message count when the function returns.
Return Values

| DP_OK | DPERR_INVALIDOBJECT |
| DPERR_INVALIDPARAMS | DPERR_INVALIDPLAYER |

Comment
    Return DPERR_INVALIDPARAMS if lpdwCount is NULL.
GetSessionDesc
    This method returns properties of the current open session. After the function returns, the pointer lpData should be cast to LPSESSIONDESC2 in order to read the session description data.
    HRESULT GetSessionDesc(
        LPDIRECTPLAY lpDirectPlay,
        LPVOID lpData,
        LPDWORD lpdwDataSize)
Parameters
lpDirectPlay
    Pointer to the Direct play object.
lpData
    A pointer to a buffer where the session description data is to be written. Passing NULL means that only the size of data is being requested. *lpdwDataSize will be set to size required to hold the data.
lpdwDataSize
    Pointer to a DWORD which is initialized to size of the buffer before calling the function. A after the function returns it will be set to the size, in bytes, of the group data. If the buffer was too small (DPERR_BUFFERTOOSMALL), then this will be set to the buffer size required.
Return Values

| DP_OK | DPERR_INVALIDOBJECT |
| DPERR_BUFFERTOOSMALL | DPERR_NOCONNECTION |

Initialize
    This member is provided for compliance with the Common Object Model (COM) protocol. Since the Direct play object is initialized when it is created, calling this member will always result in the DDERR_ALREADYINITIALIZED return value.
    HRESULT Initialize(
        LPDIRECTPLAY lpDirectPlay,
        GUIDE FAR *lPGUID)
Parameters
lpDirectPlay
    Pointer to the Direct play object.
lpGUID
    Points to the GUIDE used as the interface identifier.
Return Values
    √VDPERR_ALREADYINITIALIZED
Queryinterface
    This member is part of the IUnknown interface inherited by Direct play. QueryInterface is used to increase the reference count of the Direct play object. This is the member that applications use to determine whether the Direct play object supports additional interfaces that they may be interested in. An application can ask the Direct play object if it supports a particular COM interface and if it does, the application may begin using that interface immediately. If the application does not want to use that interface it must call Release to free it. This member allows Direct play objects to be extended by others without breaking, or interfering with, each other's existing or future functionality.
    HRESULT Queryinterface(
        LPDIRECTPLAY lpDirectPlay,
        LPVOID rigid,
        LPVOID FAR* obp)
Parameters
lpDirectPlay
    Points to the Direct play structure representing the Direct play.
rigid
    Points to a UUID. (Universally Unique Identifier)
obp
    Points to a pointer that will be filled with the interface pointer if the query is successful.
Return Values

| DP_OK | DPERR_INVALIDOBJECT |
| DPERR_INVALIDPARAMS | |

Service Provider Initialization
SPInit
    This is the only exported function from the service provider DLL. Direct play will call this function first to initialize the service provider. The service provider should check to make sure all the resources that are required to operate properly are available (e.g. hardware/software, protocols) and return either DP_OK or DPERR_UNAVAILABLE. The service provider must fill in the function pointers to those functions which have been implemented, the version number, and the message header size. It should parse the Direct play Address data if possible and store it for later use.
    HRESULT WINAPI SPInit(
        LPSPINITDATA lpSPData)

```
typedef struct {
    LPDPSP_SPCALLBACKS   lpCB;
    IDirectPlaySP        *lpISP;
    LPWSTR               lpszName;
    LPGUID               lpGuid;
    DWORD                dwReserved1;
    DWORD                dwReserved2;
    DWORD                dwSPHeaderSize;
    LPDPADDRESS          lpAddress;
    DWORD                dwAddressSize;
    DWORD                dwSPVersion
} SPINITDATA, FAR *LPSPINITDATA;
``` lpCB
    Pointer to a DPSP_SPCALLBACK structure containing function pointers to those service provider functions which have been implemented. Direct play will initially set all the function pointers to NULL. The service provider only needs to intialize the pointers to those function which have been implemented. The functions Send, EnumSessions and Reply MUST be filled in.

```
typedef struct {
    DWORD                       dwSize;
    DWORD                       dwFlags;
    LPDPSP_ENUMSESSIONS         EnumSessions;
    LPDPSP_REPLY                Reply;
    LPDPSP_SEND                 Send;
    LPDPSP_ADDPLAYERTOGROUP     AddPlayerToGroup;
    LPDPSP_CLOSE                Close;
    LPDPSP_CREATEGROUP          CreateGroup;
    LPDPSP_CREATEPLAYER         CreatePlayer;
    LPDPSP_DELETEGROUP          DeleteGroup;
    LPDPSP_DELETEPLAYER         DeletePlayer;
    LPDPSP_GETADDRESS           GetAddressData;
    LPDPSP_GETCAPS              GetCaps;
    LPDPSP_OPEN                 Open;
    LPDPSP_REMOVEPLAYERFROMGROUP RemovePlayerFromGroup;
    LPDPSP_SENDTOGROUP          SendToGroup;
    LPDPSP_SHUTDOWN             Shutdown;
} DPSP_SPCALLBACKS, FAR *LPDPSP_SPCALLBACKS;
``` dwSize
Size of the structure in bytes. This will be filled in by Direct play before calling the function.
dwFlags
Not used. Will be initialized to zero.
EnumSessions, Reply, Send
Function pointers to service provider functions that must be implemented.
lpISP
Pointer to the IDirectPlaySP interface. The service provider must save this pointer in order to call the Direct play callback functions.
lpszName
Unicode string with the name of the service provider as it appears in the registry
lpGuid
Pointer to the GUIDE of the service provider to be initialized. A single DLL may implement more than one service provider, each one must have a different GUIDE. This parameter indicates which one to initialize.
dwReserved1, dwReserved2
Reserved for use by the service provider. Contains the contents of the reserved registry entries.
dwSPHeaderSize
The maximum number of bytes required by the service provider to add header information to messages. Direct play will leave this many bytes at the beginning of messages being sent (See FIG. 1.) Direct play will initialize this data member to zero; the service provider should fill this in if message header space will be needed.
lpAddress
Pointer to a block of Direct play address information used to connect the service provider over its transport. By supplying this information here, it may not be necessary for the service provide to ask the user for the information during SP_EnumSessions or SP_Open. This information will typically be supplied by a lobby which has launched the application. The service provider should use the EnumAddress function in the IDirectPlaySP interface to parse this data.
dwAddressSize
The size, in bytes, of the address data.
dwVersion
The service provider must fill this in with the version number. The hi-word is the major number and the low-word is the minor version. The service provider header file (DPLAYSP.H) defines the HIWORD of the version. The LOWORD is service provider specific. Set this to the value:
(DPSP_MAtJORVERSION I SP_VERSION ). Direct play will examine the HIWORD of the version to make sure the service provider was compiled with the proper released version of the header file.
Returns
    DP_OK
    DPERR_UNAVAILABLE—if the resources required to operate the service provider are unavailable.
IDirectPlaySP Functions
The following functions in Direct play may be called by a service provider through the IDireciPlaySP COM interface.
AddMRUEntry
The method may be called by the service provider to store some data in a persistent MRU list managed by Direct play. This may be used to store connection information from previous sessions so that the user can select it from a list rather than entering it all from scratch.
    HRESULT AddMRUEntry(
        LPDIRECTPLAYSP IpDPSP,
        LPCWSTR IpSection,
        LPCWSTR IpKey,
        LPCVOID IpData,
        DWORD dwDataSize,
        DWORD dwMaxEntries)
lpDPSP
Pointer to the IDirectPlaySP interface
lpSection
The section name in the registry which information for the service provider should be stored under. Recommended that this be the description string, lpszname, passed in the SPInit function.
lpKey
The key name under which to store the MRU list. Should be something like 'MRU'.
lpData
Pointer to the data to be stored. This data can be in any format defined by the service provider.
dwDataSize
The size, in bytes, of the data to be stored.
dwMaxEntries
The maximum number of entries allowed in the MRU list. Once this maximum is reached. the entries that has not been used for longest period of time will be discarded.
Returns
    DP_OK
    DPERR_INVALIDOBJECT
    DPERR_INVALIDPARAMS
    DPERR_EXCEPTION
    DPERR_GENERIC
CreateAddress
This method may be called by the service provider to create a Direct play Address given a service provider specific network address. The resulting address will contain the GUIDE of the service provider that created it and a piece of data that the service provider can interpret as a network address. This function will be needed to implement SP_GetAddressData.
    HRESULT CreateAddress(
        LPDIRECTPLAYSP IpDPSP,
        REFGUID guidSP,
        REFGUID guidDataType,
        LPCVOID IpData,
        DWORD dwDataSize,
        LPVOID IpAddress,
        LPDWORD IpdwAddressSize)

lpDPSP
   Pointer to the IDirectPlaySP interface
guidSP
   Pointer to the GUIDE of the service provider. In C++, this is a reference to the GUIDE.
guidDataType
   Pointer to the GUIDE identifying the specific network address being used. See the "Direct play Address" section at the beginning of this document for pre-defined network address types. The service provider may define its own data type GUIDE if none of the predefined ones are appropriate. In C++, this is a reference to the GUIDE.
lpData
   Pointer to a buffer containing the specific network address data.
dwDataSize
   The size, in bytes, of the network address in *lpData.
lpAddress
   Pointer to a buffer, allocated by the service provider, where the constructed Direct play Address is to be written.
lpdwAddressSize
   Pointer to DWORD with the size of the Direct play Address buffer. Before calling this function, the service provider must initialize *lpdwAddressSize to the size of the buffer. After the function has returned it will contain the number of bytes written to lpAddress. If the buffer was-too small then this will be set to the size required to store the Direct play Address and return a DPERR_BUFFERTOOSMALL error.
Returns
   DP_OK
   DPERR_BUFFERTOOSMALL
   DPERR_INVALIDOBJECT
   DPERR_INVALIDPARAMS
   DPERR_EXCEPTION
   DPERR_GENERIC
EnumAddress
   This method may be called by the service provider to parse out chunks from the Direct play Address buffer. This function will return after all the chunks have been enumerated and passed to the callback function.
   HRESULT EnumAddress(
      LPDIRECTPLAYSP lpDPSP,
      LPDPENUMADDRESSCALLBACK lpEnumAddressCallback,
      LPCVOID lpAddress,
      DWORD dwAddressSize,
      LPVOID lpContext)
lpDPSP
   Pointer to the IDirectPlaySP interface
lpEnumAddressCallback
   Pointer to a function that will be called for each information chunk in the Direct play Address. The service provider should examine the chunk identifier in guidDataType and make a copy the data pointed at by lpData. Do not save the lpData pointer. Unrecognized guidDataTypes can be ignored.
   BOOL WINAPI EnumAddressCallback(
      REFGUID guidDataType,
      DWORD dwDataSize,
      LPCVOID lpData,
      LPVOID lpContext)
guidDataType
   The GUIDE indicating the type of this address data chunk
dwDataSize
   The size, in bytes, of the address data.
lpData
   Pointer to constant data.
lpContext
   Context passed to the callback function.
Returns
   TRUE—continue enumeration
   FALSE—stop enumeration
lpAddress
   Pointer to the start of the Direct play Address buffer
dwAddressSize
   Size of the Direct play Address
lpContext
   Context that will be passed to the callback function
Returns
   DP_OK
   DPERR_INVALIDOBJECT
   DPERR_INVALIDPARAMS
   DPERR_EXCEPTION
   DPERR_GENERIC
EnumMRUEntries
   The method may be called by the service provider to enumerate all the data that the service provider has previously stored in the MRU list using AddMRUEntry.
   HRESULT EnumMRUEntries(
      LPDIRECTPLAYSP lpDPSP,
      LPCWSTR lpSection,
      LPCWSTR lpKey,
      LPENUMMRUCALLBACK lpEnumMRUCallback,
      LPVOID lpContext)
lpDPSP
   Pointer to the IDirectPlaySP interface
lpSection
   The section name in the registry where information for the service provider was stored under using the AddMRUEntry API.
lpKey
   The key name under which the MRU list was stored.
lpEnumMRUCallBack
   Pointer to a function that will be called for each entry in the MRU list. The entries will be enumerated in order starting with the most recent.
   BOOL WINAPI EnumMRUCallback(
      LPCVOID lpData,
      DWORD dwDataSize,
      LPVOID lpContext);
lpData
   The service provider specific data that was stored using the AddMRUEntry API.
dwDataSize
   The size, in bytes, of the data
lpContext
   Context passed to the callback function.
Returns
   TRUE—continue enumeration
   FALSE—stop enumeration
lpContext
   Context to be passed to the callback function.
Returns
   DP_OK
   DPERR_INVALIDOBJECT
   DPERR_INVALIDPARAMS
   DPERR_EXCEPTION
   DPERR_GENERIC
GetPlayerFlags This method may be called by the service provider to obtain the flags associated with particular player/group ID.

HRESULT GetPlayerFlags(
  LPDIRECTPLAYSP IpDPSP,
  DPID id,
  LPDWORD IpdwFlags);

IpDPSP
  Pointer to the IDirectPlaySP interface
id
  ID of the player or group to get the flags for
IpdwFlags
  Pointer to DWORD which will be set with the flags associated with the player/group. The flags and their meanings are as follows:
  DPLAYI_PLAYER_SYSPLAYER—This is the system player. Direct play exchanges system messages (e.g. DPSYS_CREATEPLAYERORGROUP) via the system players. There is one system player for each Direct play object.
  DPLAYI_PLAYER_NAMESERVER—This player is the name server (session host). This flag is set only when the DPLAYI_PLAYER_SYSPLAYER flag is also set.
  DPLAYI_PLAYER_PLAYERINGROUP—This player belongs to a group.
  DPLAYI PLAYER_PLAYERLOCAL—This player/group was created on this machine.

Returns
  DP_OK
  DPERR_INVALIDPLAYER
  DPERR_INVALIDOBJECT
  DPERR_INVALIDPARAMS
  DPERR_EXCEPTION
  DPERR_GENERIC GetSPPlayerData
  This method may be used by the service provider to retrieve a block of data associated with a particular Player or Group ID previously stored using the SetSPPlayerData API. This method by used to retrieve either local or remote data. See SetSPPlayerData for details.

HRESULT GetSPPlayerData(
  LPDIRECTPLAYSP IpDPSP,
  DPID id,
  LPVOID *IplpData,
  LPDWORD IpdwDataSize
  WORD dwFlags);

IpDPSP
  Pointer to the IDirectPlaySP interface
id
  ID of the player or group to retrieve the data for
lplpData
  Pointer to a pointer which will be set to point to the buffer containing the player/group data Note that the buffer is read only.
IpdwDataSize
  Pointer to DWORD which will be set to the size, in bytes, or the player/group data
dwFlags
  Flags indicating whether to get the local or remote data associated with the ID. If dwFlags=0, the remote data will be retrieved.
  DPGET_LOCAL—Get the local data associated with this ID Returns
  DP_OK
  DPERR_INVALIDPLAYER
  DPERR_INVALIDOBJECT
  DPERR_INVALIDPARAMS
  DPERR_EXCEPTION
  DPERR_GENERIC HandleMessage
  The service provider must call this function in Direct play every time it receives a message. In some cases, the message will require Direct play to take some action which will require calling back into a service provider function (e.g. SP_Repay if the message requires a reply, or SP_CreatePlayer if the message indicates that new remote player has been created). If it does, the function will be called before HandleMessage( ) returns.
  It is the responsibility of the service provider to check the integrity of the data before passing it on to Direct play for processing. If data integrity checking is not part of the network protocol, then the service provider must add some kind of checksum to the message when it is sent using SP_Send and verify that checksum when it receives a messages. Corrupt messages sent guaranteed will have to be resent. Corrupt non-guaranteed messages may be thrown away and ignored.

HRESULT HandleMessage(
  LPDIRECTPLAYSP IpDPSP,
  LPVOID IpMessageBody,
  DWORD dwMessageBodySize,
  LPVOID IpMessageHeader)

IpDPSP
  Pointer to the IDirectPlaySP interface
lpMessageBody
  Pointer the buffer containing the message body (see FIG. 1.)
dwMessageBodySize
  Size of the message body only (not including the header)
IpMessageHeader
  Pointer to the message header. The buffer containing the message header must be the same size as the dwSPMessageHeader value returned by SPInit( )Since dwSPMessageHeader is the maximum size of the message header, it is possible that the actual header on the message received is smaller (the particular implementation of SP_Send will determine if this is the case) in which case the header should be copied to a buffer that is dwSPMessageHeader bytes long.
  The service provider has the opportunity at this point to add additional information to the message header before passing it up to Direct play. Direct play will make a copy of this message header and pass it back to some of the service provider callback functions. For example, SP_Reply if it is going to reply to this message. The additional information added at this point may be needed by the SP_Reply function. There is no way for the service provider to know which callback function will be called as a result of this message so it should add enough information for all of them to use.

Returns
  DP_OK
  DPERR_INVALIDOBJECT
  DPERR_INVALIDPARAMS
  DPERR_EXCEPTION
  DPERR_GENERIC SetSPPlayerData
  This method may be used by the service provider to associate a block of data with a particular Player or Group ID so that it may be retrieved later using the GetSPPlayerData API. There are two types of data that can be set—local and remote. Local data can only be read back by the process which set it. Remote data is stored with the internal name table and is sent to remote machines when a request to create the player is sent. See SP_CreatePlayer for more details.

```
HRESULT SetSPPlayerData(
    LPDIRECTPLAYSP lpDPSP,
    DPID id,
    LPVOID lpData,
    DWORD dwDataSize,
    DWORD dwFlags);
``` lpDPSP
  Pointer to the IDirectPlaySP interface
id
  ID of the player or group to associate the data with
lpData
  Pointer to a buffer containing the player/group data.
dwDataSize
  The size, in bytes, or the player/group data
dwFlags
  Flags indicating whether to set the local or remote data associated with the ID. If dwFlags=0, the remote data will be set.
  DPSET_LIOCAIL—Get the local data associated with this ID
Returns
  DP_OK
  DPERR_INVALIDPLAYER
  DPERR_INVALIDOBJECT
  DPERR_INVALIDPARAMS
  DPERR_EXCEPTION
  DPERR_GENERIC Service Provider Callback Functions
  The following functions are implemented in service providers.

SP_EnumSessions
  The purpose of this function is to locate one or more session hosts (name servers) on the network and send them this message. This is the first time that a network connection should be established (if not already connected).
  The name server will reply with information about the session it is hosting. Ideally, only name servers should be sent this message. However, there is no harm in sending this message to machines that are not hosting a Direct play application since they will just ignore the message.
  The service provider may display a dialog if a network address or other information is needed. If user information is needed, the service provider should check if was supplied in the Direct play Address when SPInit was called in which case a dialog is not needed. The service provider may also use the EnumMRUEntries API to obtain previous connection information and present it to the user for selection.

| HRESULT WINAPI SP_EnumSessions( LPDPSP_ENUMSESSIONSDATA) |
|---|

```
typedef struct      {
    LPVOID          lpMessage;
    DWORD           dwMessageSize;
} DPSP_ENUMSESSIONSDATA, FAR *LPDPSP_ENUMSESSIONSDATA;
``` lpMessage
  Pointer to the buffer containing the message header and message body (See FIG. 1)
dwMessageSize
  Size, in bytes, of the message buffer.
Returns
  DP_OK
  DPERR_GENERIC—function call failed SP_Reply
  Reply to a message received. Direct play will call this function from within HandleMessage if the message requires a reply. All messages sent using this function should be sent using a guaranteed method.

| HRESULT WINAPI SP_Reply( LPDPSP_REPLYDATA) |
|---|

```
typedef struct      {
    LPVOID          lpsPMessageReader;
    LPVOID          lpMessage;
    DWORD           dwMessageSize;
    DPID            idNameServer;
} DPSP_REPLYDATA, FAR *LPDPSP_REPLYDATA;
``` lpSPMessageHeader
  Pointer to a buffer containing the message header of the message that is being replied to. If the sending service provider (in SP_Send) added any information to help direct the reply back properly, it should be read from this data block. The service provider may also have added information to the header before handing it off to HandleMessage.
lpMessage
  Pointer to the buffer containing the message header and message body (see FIG. 1.) to send back as the reply.
dwMessageSize
  Size, in bytes, of the message buffer.
idNameServer
  The player ID of the name server (host). The service provider should store this ID since it is possible for the host to migrate to a different machine.
Returns
  DP_OK
  DPERR_SENDTOOBIG—the message is too big to send
  DPERR_SESSIONLOST—the connection to the session or network has been lost
  DPERR_GENERIC—function call failed SP_Send
  Sends the given data buffer to the destination player (or to the name server if the destination player is zero). Direct play will only provide a Player ID to send the message to.
  If the service provider needs a network address to direct the message to, it should implement the SP_CreatePlayer function and associate a network address with the Player ID using the SetSPPlayerData function. When a message needs to be sent to the Player ID, the network address can be retrieved using GetSPPlayerData.
  The service provider has the opportunity at this point to add information to the message header that might be useful to the service provider on the receiving end. If the bSystemMessage flag is set, it means that this is a system message and that the receiving player may need to reply to it so any information needed to direct the reply should be added to the message header. The objective is to minimize the number of bytes sent out over the network.

It is the responsibility of the service provider to check the integrity of the data before passing it on to Direct play for processing. If data integrity checking is not part of the network protocol, then the service provider must add some kind of checksum to the message when it is sent using SP_Send and verify that checksum when it receives a messages. Corrupt messages sent guaranteed will have to be resent. Corrupt non-guaranteed messages may be thrown away and ignored.

| HRESULT WINAPI SP_Send( LPDPSP_SENDATA) | |
|---|---|
| typedef struct | { |
| DWORD | dwFlags; |
| DPID | idPlayerTo; |
| DPID | idPlayerFrom; |
| LPVOID | lpMessage; |
| DWORD | dwMessagesize; |
| BOOL | bSystemMessage; |
| } DPSP_SENDDATA, FAR *LPDPSP_SENDDATA; | | dwFlags

The flags indicating how the message should be sent. If dwFlags =0, the message is sent non-guaranteed.

DPSEND_GUARANTEED Send the message using a guaranteed method of delivery if it is available. If guaranteed delivery is not supported then use non-guaranteed delivery.

idPlayerTo

Player ID the message is being sent to. Player ID of zero means it is being sent to the name server. NOT all players in the sessions like it says in the Direct play API documentation.

idPlayerFrom

Player ID that the message is being sent from. Player ID of zero means that the message is being sent from Direct play and not any particular player on this machine.

lpMessage

Figure 1:
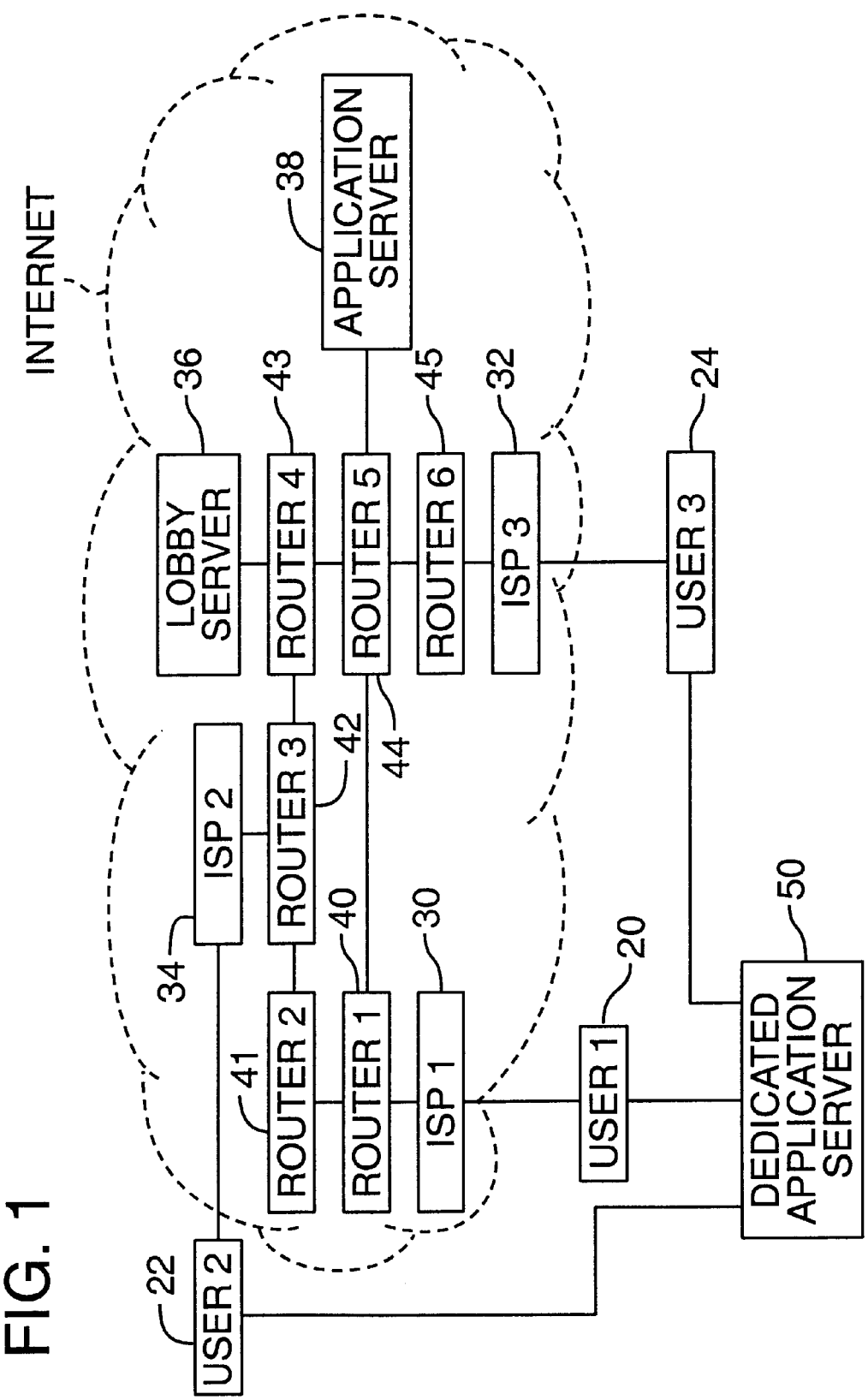
FIG. 1 is a network diagram of a wide area network such as the Internet with a lobby server and an application server.
Figure 2:
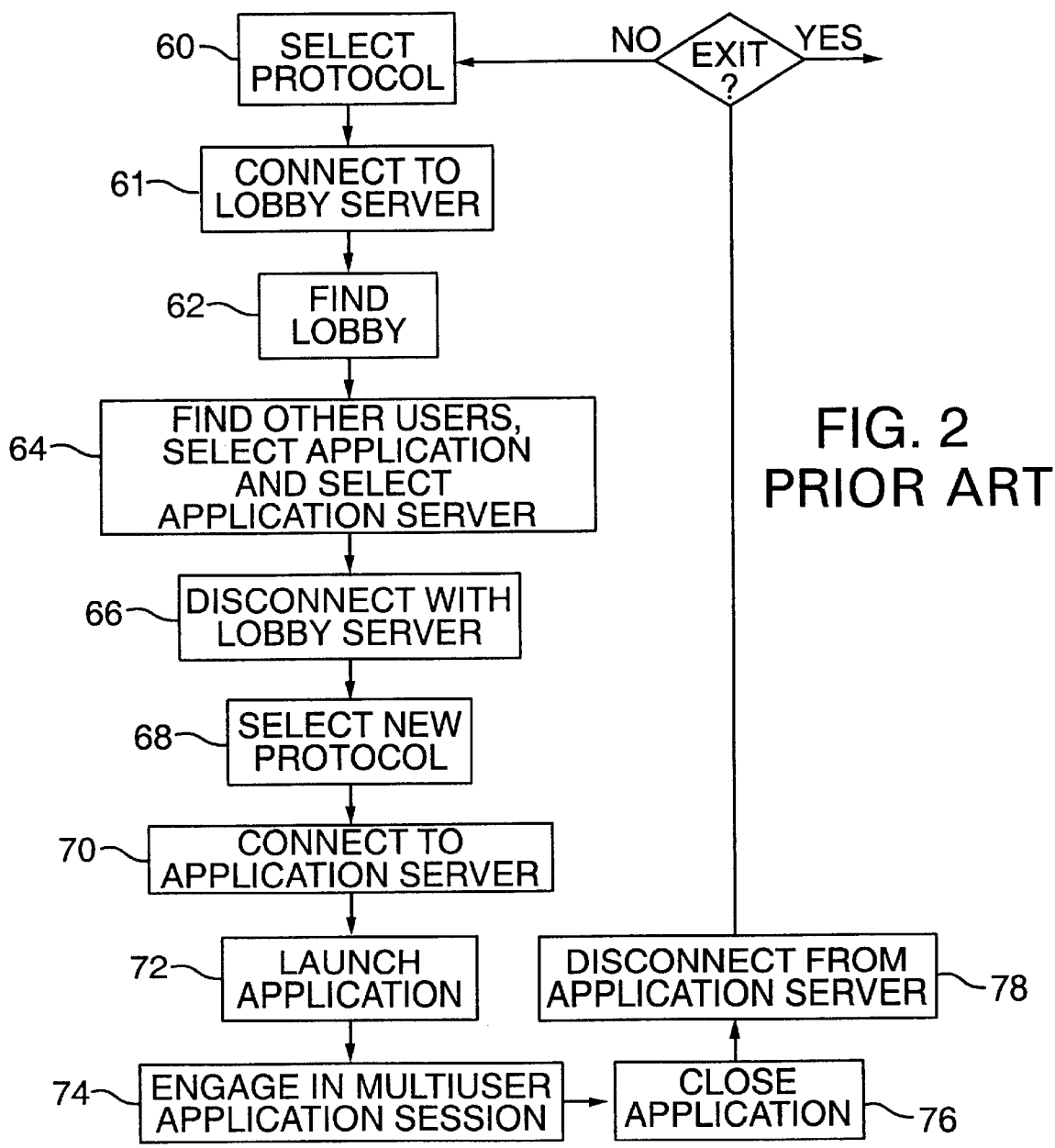
FIG. 2 is a flowchart showing the steps taken by the user following prior art methods of switching communication protocols and links.

Pointer to the buffer containing the message header and message body (See FIG. 1). A NULL lpMessage means that there is no message to send. This may the case if the application just wants to specify DPSEND_OPENSTREAM or DPSEND_CLOSETREAM without sending a message.

dwMessageSize

Size of the message buffer in bytes bSystemMessage

TRUE if this message is a system message. This means that the recipient may need to reply to this message therefore the service provider should try to put information into the header so the recipient knows where to direct the reply message to. If this is FALSE, the service provider should attempt to minimize the overhead of a message header and deliver it as efficiently as possible since there won't be any reply.

Returns

DP_OK

DPERR_INVALIDPLAYER—an invalid player id was specified

DPERR_SENDTOOBIG—the message is too big to send

DPERR_SESSIONLOST—the connection to the session or network has been lost

DPERR_GENERIC—function call failed

| Lobby Member Function Summary | |
|---|---|
| Application management | |
| EnumLocalApplications | Enumerate the local applications registered with DirectPlay on this machine. |
| RunApplication | Launch and connect an application. |
| Address management | |
| CreateAddress | Create a DirectPlay Address |
| EnumAddress | Enumerate the chunks in a DirectPlay Address |
| Data management | |
| GetConnectionSettings | Used to obtain the DPLCONNECTION data structure used in RunApplication |
| SetApplicationData | Used to send a block of data. |
| SetDataEvent | Used by the application to set an event to be triggered when the shared memory has been changed by the lobby client |
| GetApplicationData | Used to retrieve a block of data. |

IDirectPlayLobby Return Codes

DPL_OK

The OK message indicates success and is returned when any DirectPlayLobby related member has performed the action requested of it.

DPL_OK

Request completed successfully.

Error Return Codes

Errors are represented by negative values and cannot be combined. This table lists the failures that can be returned by all DirectPlayLobby members. See the individual member descriptions for a list of the error codes each one is capable of returning.

DPERR_APPNOTSTARTEDDPERR

The application has not been started yet

DPERR_BUFFERTOOLARGEDPERR

The data buffer is too large to store.

DPERR_BUFFERTOOSMALL

The data buffer is too small to hold the data being returned

DPERR_CANTCREATEPROCESS

Can't launch the application

DPERR_GENERIC

Generic error

DPERR_INVALIDINTERFACE

The interface parameter is invalid

DPERR_INVALIDOBJECT

There is an invalid object in the parameter list

DPERR_INVALIDPARAMS

This function has been used with invalid parameters

DPERR_NOTLOBBIED

Returned by DirectPlayConnect if the application was not launched using IDirectPlayLobby::RunApplication

DPERR_OUTOFMEMORY

Out of memory

DPERR_TIMEOUT

The function was not completed successfully due to a time-out.

DPERR_UNKNOWNAPPLICATION

An unknown application was specified

Lobby Member Functions

Connect

This method is used by an application to connect it to a session using the connection data supplied by the lobby client in the RunApplication method. Executing this function successfully will create a Direct play object with the correct service provider, and Open the correct session without asking the user to fill in any dialogs. If this function fails with the DPERR_NOTLOBBIED error code, then the application should perform the normal steps of calling DirectPlayEnumerate, DirectPlayCreate, EnumSessions and Open. If it fails on any other error code, then there was a problem getting connected to the session.

Before calling this method, the application may examine the connection settings that will be used to launch the application using GetConnectionSettings, modify them and set them using SetConnectionSettings. The application should pay particular attention to the SESSIONDESC2 structure to make sure the proper session properties are set—especially dwflags, dwMaxPlayers, and the dwUser fields.

HRESULT WINAPI Connect(
    LPDIRECTPLAYLOBBY IpDPL,
    DWORD dwFlags,
    LPDIRECTPLAY2 FAR *IplpDP,
    IUnknown FAR *pUnk);

Parameters
IpDPL
    Pointer to the DirectPlayLobby object
dwFlags
    Not used at this time. Must be zero.
IplpDP
    Pointer to a pointer to be initialized with a valid IDireetPlay2 (if compiling for UNICODE) or IDirectPlay2A (otherwise) interface.
IpUnk
    Pointer to the containing lUnkown. This parameter is provided for future compability with COM aggregation features. Presently, however, DirectPlayConnect will return an error if it is anything but NULL.

Returns
    DP_OK
    DPERR_INVALIDINTERFACE
    DPERR_INVALIDOBJECT
    DPERR_INVALIDPARAMS
    DPERR_INVALIDFLAGS
    DPERR_NOTLOBBIED
    DPERR_OUTOFMEMORY
    CLASS_E_NOAGGREGATION CreateAddress
    This method is used to create a Direct play Address given a service provider specific network address. The resulting address will contain the GUIDE of the service provider and a piece of data that the service provider can interpret as a network address.

HRESULT CreateAddress(
    LPDIRECTPLAYLOBBY IpDPL,
    REFGUID guidSP,
    REFGUID guidDataType,
    LPCVOID IpData,
    DWORD dwDataSize,
    LPVOID IpAddress,
    LPDWORD IpdwAddressSize)

IpDPL
    Pointer to the DirectPlayLobby object
guide
    Pointer to the GUIDE of the service provider. (In C++, it is a reference to the GUIDE)
guidDataType
    A GUIDE identifying the specific network address being used. See the "Direct play Address" section at the beginning of this document for pre-defined network address types. (In C++, it is a reference to the GUIDE)
IpData
    Pointer to a buffer containing the specific network address.
dwDataSize
    The size, in bytes, of the network address in *IpData.
IpAddress
    Pointer to a buffer where the constructed Direct play Address is to be written.
IpdwAddressSize
    Pointer to DWORD with the size of the Direct play Address buffer. Before calling this function, the service provider must initialize *IpdwAddressSize to the size of the buffer. After the function has returned it will contain the number of bytes written to IpAddress. If the buffer was too small then this will be set to the size required to store the Direct play Address.

Returns
    DP_OK
    DPERR_BUFFERTOOSMALL
    DPERR_INVALIDPARAMS

EnumAddress
    This method is used to parse out chunks from the Direct play Address buffer.

HRESULT EnumAddress(
    LPDIRECTPLAYLOBBY IpDPL,
    LPDPENUMADDRESS IpEnumAddressCallback,
    LPCVOID IpAddress,
    DWORD dwAddressSize,
    LPVOID IpContext)

IpDPL
    Pointer to the DirectPlayLobby object
IpEnumAddressCallback
    Pointer to a function that will be called for each information chunk in the Direct play Address. The service provider should examine the GUIDE in guidDataType and process or store the IpData. Unrecognized guidDataTypes can be ignored.

BOOL WINAPI EnumAddressCallback(
    REFGUID guidDataType,
    DWORD dwDataSize,
    LPCVOID IpData,
    LPVOID IpContext)

guidDataType
    The GUIDE indicating the type of this data chunk
dwDataSize
    The size, in bytes, of the data chunk.
IpData
    Pointer to constant data.
IpContext
    Context passed to the callback function.

Returns
    TRUE—continue enumeration
    FALSE—stop enumeration

IpAddress
    Pointer to the start of the Direct play Address buffer
dwAddressSize
    Size of the Direct play Address
IpContext
    Context that will be passed to the callback function Returns
    DP_OK

DPERR_INVALIDOBJECT
DPERR_INVALIDPARAMS
DPERR_EXCEPTION

EnumAddressTypes

This method is used to enumerate all the address types that a given service provider needs in order to build a Direct play address.

```
HRESULT EnumAddressTypes(
    LPDIRECTPLAYLOBBY lpDPL,
    LPDPLENUMADDRESSTYPESCALLBACK
    lpEnumAddressTypesCallback,
    REFGUID guidSP,
    LPVOID lpContext,
    DWORD dwFlags)
``` lpDPL
Pointer to the DirectPlayLobby object lpEnumAddressTypeCallback
Pointer to a function that will be called for each address type for a service provider. If the service provider takes no address type, then the callback will not be called.

```
BOOL WINAPI EnumAddressTypeCallback(
    REFGUID guidDataType,
    LPVOID lpContext,
    DWORD dwFlags)
``` guidDataType
The GUIDE indicating the address type. Predefine address types are DPAID_Phone, DPAID_Inet, DPAID_ComPort. See "Direct play Address" for information on these address types.

lpContext
Context passed to the callback function.

dwFlags
Not used at this time.

Returns
TRUE—continue enumeration
FALSE—stop enumeration guidSP
GUIDE of the service provider whose address types are to be enumerated.

lpContext
Context that will be passed to the callback function dwFlags
Not used at this time. Must be zero.

Returns
DP_OK
DPERR_INVALIDOBJECT
DPERR_INVALIDPARAMS
DPERR_EXCEPTION

EnumLocalApplications

This method is used to enumerate what applications are registered with Direct play.

```
HRESULT EnumLocalApplications(
    LPDIRECTPLAYLOBBY lpDPL,
    LPDPENUMLOCALAPPLICATIONSCALLBACK
    lpCallback,
    LPVOID lpContext,
    DWORD dwFlags)
```

Parameters lpDPL
Pointer to the DirectPlayLobby object lpCallback
Pointer to the callback function that will be called for each application enumerated

```
BOOL WINAPI lpCallback(
    LPCDPLAPPINFO lpAppinfo,
    LPVOID lpContext,
    DWORD dwFlags);
``` lpAppInfo
Pointer to read only DPLAPPINFO structure containing informatin about the application being enumerated lpContext
Context passed in from the EnumLocalApplications call dwFlags
Unused at this time. Must be zero.

Return
TRUE—continue enumeration
FALSE—end enumeration lpContext
Context passed to the callback function dwFlags
Currently not used. Set to zero.

Returns

| DPL_OK | DPERR_GENERIC |
| DPERR_INVALIDINTERFACE | DPERR_INVALIDOBJECT |
| DPERR_INVALIDPARAMS | DPERR_OUTOFMEMORY |

Comments
None.

ReceiveLobbyMessage

This method is used to get a message sent between a lobby client application and a Direct play application. Messages will be queued so there is no danger of losing data if it is not read in time.

```
ReceiveLobbyMessage(
    LPDIRECTPLAYLOBBY lpDPL,
    DWORD dwFlags,
    DWORD dwAppID,
    LPDWORD lpdwMessageFlags,
    LPVOID lpData,
    LPDWORD lpdwDataSize)
```

Parameters lpDPL
Pointer to the DirectPlayLobby object dwFlags
Not currently used. Must be zero.

dwAppID
When called from a lobby client (which may share data with several applications), this identifies which application's data to retrieve. This ID number is obtained from RunApplication. When called from an application (which only shares data with one lobby client), this parameter must be zero.

lpdwMessageFlags
Flags indicating what type of message is being returned. If *lpdwMessageFlags is zero, the data is application specific.

DPLAD_SYSTEM
This is a system message informing the caller of some event. To determine what type of event occurred, cast the lpData pointer to LPDPLMSG_GENERIC and switch on the dwType member to see exactly what type of system message it is. Based on this type, cast lpData to the appropriate system message structure to read the information.

lpData
A pointer to a buffer where the connection data data is to be written. Passing NULL means that only the size of data is being requested. *lpdwDataSize will be set to minimum size required to hold the data.

lpdwDataSize
  Pointer to a DWORD which is initialized to size of the buffer before calling the function. After the function returns it will be set to the size, in bytes, of the group data. If the buffer was too small (DPERR_BUFFERTOOSMALL), then this will be set to the minimum buffer size required.
Returns

| | |
|---|---|
| DPL_OK | DPERR_BUFFERTOOSMALL |
| DPERR_APPNOTSTARTEDDPERR | DPERR_GENERIC |
| DPERR_INVALIDINTERFACE | DPERR_INVALIDOBJECT |
| DPERR_INVALIDPARAMS | DPERR_OUTOFMEMORY |
| DPERR_NOAPPLICATIONDATA | |

GetConnectionSettings
  This method is used to obtain the DPLCONNECTION data structure which contains all the informatin needed to launch and connect an application. The data returns is same data that was passed to the RunApplication method or modified using SetConnectionSettings.
  GetConnectionSettings(
    LPDIRECTPLAYLOBBY lpDPL,
    DWORD dwAppID,
    LPVOID lpData,
    LPDWORD lpdwDataSize)
Parameters
lpDPL
  Pointer to the DirectPlayLobby object
dwAppID
  When called from a lobby client (which may share data with several applications), this identifies which application's connection settings to retrieve. This ID number is obtained from RunApplication. When called from an application (which only shares data with one lobby client), this parameter must be zero.
lpData
  A pointer to a buffer where the connection data data is to be written. Passing NULL means that only the size of data is being requested. *lpdwDataSize will be set to minimum size required to hold the data.
lpdwDataSize Pointer to a DWORD which is initialized to size of the buffer before calling the function. After the function returns it will be set to the size, in bytes, of the group data. If the buffer was too small (DPERR_BUFFERTOOSMALL), then this will be set to the minimum buffer size required.
  Returns
    DPL_OK
    DPERR_INVALIDINTERFACE
    DPERR_INVALIDOBJECT
    DPERR_INVALIDPARAMS
    DPERR_OUTOFMEMORY
    DPERR_NOTLOBBIED
    DPERR_BUFFERTOOSMALL
    DPERR_GENERIC
Comments
  The lpData member should be cast to LPDPLCONNECTION when the function returns to read the data from it.
RunApplication
  This method is used by a lobby client to launch an application and pass it all the information necessary to connect it to a session. This function will return once the application process has been created. The lobby client will receive system message indicating the status of the application. If the lobby client is launching an application that will be hosting a session, it should wait umtil it receives a DPI,SYS_SESSIONCREATED system message before launching the other applications that will be joining the session. If the application was unable to create or join a session, a DPLSYS_DPLAYCONNECTFAILED message will be generated. The lobby client will also receive a DPLSYS_CONNECTIONSETTINGSREAD system message when the application has read the connection settings and a DPLSYS_APPTERMINATED system message when the application terminates.
  It is important that the lobby client not release its IDirectPlayLobby interface before it receives a DPLSYS_CONNECTIONSETTINGSREAD system message. The lobby client can either check ReceiveLobbyMessage in a loop until it is received or supply a synchronization event.
  RunApplication(
    LPDIRECTPLAYLOBBY lpDPL,
    DWORD dwFlags,
    LPDWORD lpdwAppID,
    LPDPLCONNECTION lpConn,
    HANDLE hReceiveEvent)
lpDPL
  Pointer to the DirectPlayLobby object
dwFlags
  Not currently used. Must be zero.
lpdwAppId
  Pointer to a DWORD which will be filled with an ID number identifying the application that was started. The lobby client must save this AppId for use on any SetApplicationData and GetApplicationData calls.
lpConn
  Pointer to a DPLCONNECTION structure which contains all the information necessary to specify which application to launch and how to get it connected to a session instance without displaying any user dialogs.
hReceiveEvent
  A synchronization event that will be set when the application sets some application data or a system message is generated. This event may be changed later using SetLobbyMessageEvent.
Returns

| | |
|---|---|
| DPL_OK | DPERR_CANTCREATEPROCESS |
| DPERR_GENERIC | DPERR_INVALIDINTERFACE |
| DPERR_INVALIDOBJECT | DPERR_INVALIDPARAMS |
| DPERR_OUTOFMEMORY | DPERR_UNKNOWNAPPLICATION |

SendLobbyMessage
  This method will send a message between the application and the lobby client. An event will be triggered informing the recipient that the data has changed.
  SendLobbyMessage(
    LPDIRECTPLAYLOBBY lpDPL,
    DWORD dwFlags,
    DWORD dwAppID,
    LPVOID lpData,
    DWORD dwDataSize)
Parameters
lpDPL
  Pointer to the DirectPlayLobby object
dwFlags
  Not currently used. Must be zero.
dwAppID
  When called from a lobby client (which may communicate with several applications), this identifies which application to send a message to. When called from an application (which only communicates with one lobby client), this parameter must be zero. This ID number is obtained from RunApplication.
lpData
  Pointer to the buffer containing the data to send.
dwDataSize
  The size, in bytes, of the buffer.
Returns

| | |
|---|---|
| DPL_OK | DPERR_BUFFERTOOLARGEDPERR |
| DPERR_APPNOTSTARTEDDPERR | DPERR_GENERIC |
| DPERR_INVALIDINTERFACE | DPERR_INVALIDOBJECT |
| DPERR_INVALIDPARAMS | DPERR_OUTOFMEMORY |
| DPERR_TIMEOUT | |

SetConnectionSettings
  This method is used to modify the DPLCONNECTION data structure which contains all the information needed to launch and connect an application.
    SetConnectionSettings(
      LPDIRECTPLAYLOBBY lpDPL,
      DWORD dwAppID,
      LPVOID lpData,
      DWORD dwDataSize)
Parameters
lpDPL
  Pointer to the DirectPlayLobby object
dwAppID
  When called from a lobby client (which may share data with several applications), this identifies which application's connection settings to retrieve. This ID number is obtained from RunApplication. When called from an application (which only shares data with one lobby client), this parameter must be zero.
lpData
  A pointer to a buffer containing the connection settings.
dwDataSize
  The size, in bytes, of the buffer.
Returns

| | |
|---|---|
| DPL_OK | DPERR_GENERIC |
| DPERR_INVALIDINTERFACE | DPERR_INVALIDOBJECT |
| DPERR_INVALIDPARAMS | DPERR_OUTOFMEMORY |

SetLobbyMessageEvent
  This method is used to register an event that will be set when a lobby message is received. This method must be called by the application if it wants to synchronize on messages. It may be called by the lobby client to change the events specified in RunApplication.
    SetLobbyMessageEvent(
      LPDIRECTPLAYLOBBY lpDPL,
      DWORD dwAppID,
      DWORD dwFlags,
      HANDLE hReceiveEvent)
Parameters
lpDPL
  Pointer to the DirectPlayLobby object
dwFlags
  Not currently used. Must be zero.
dwAppID
  When called from a lobby client (which communicates with several applications), this identifies which the event is associated with. When called from an application (which only shares data with one lobby client), this parameter must be zero. This ID number is obtained from RunApplication.

hReceiveEvent
  Event handle to be set when a message is received.

Returns

| | |
|---|---|
| DPL_OK | DPERR_GENERIC |
| DPERR_INVALIDINTERFACE | DPERR_INVALIDOBJECT |
| DPERR_INVALIDPARAMS | DPERR_OUTOFMEMORY |

Conclusion

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. A method for switching communication protocols between a client computer and remote computers, the method comprising:
  establishing a first connection with a first remote computer according to a first communication protocol;
  in a first process executing on the client computer, receiving a connectivity address from the first remote computer via the first connection, wherein the connectivity address provides address information to establish a second connection with a second remote computer; and
  using the connectivity address to establish the second connection with the second remote computer automatically and without prompting a user for the address information, where the second connection employs a second communication protocol and the second communication protocol is different than the first communication protocol;
  wherein the first process comprises a first application programming interface program executing on the client computer, and wherein the first application programming interface program establishes the second connection by terminating a first service provider program that implements the first communication protocol and launching a second service provider program that implements the second communication protocol;
  wherein the first application programming interface program is responsive to application programs executing on the client computer to receive device independent function calls to send and receive messages to the remote computers, where the device independent function calls are independent of the device and communication protocols used to send the messages; and wherein the first application programming interface program establishes the second connection in response to a first message sent by a second application programming interface program executing on the first remote computer, wherein the first message includes the connectivity address, and wherein the connectivity address includes a service provider identifier of the second service provider program and a telephone number or network address.

2. The method of claim 1 wherein the second application programming interface program is operable to send the first message in response to a remote connection function call from a remote application program executing on the first remote computer.

3. The method of claim 1 wherein the first application programming interface program is operable to save state information of the first connection, and is responsive to a system message to restore state of the first connection.

4. The method of claim 1 wherein the client computer is executing a multi-tasking operating system that allows changes in focus among multi-tasking application programs, wherein the first application programming interface program maintains state information about a previous connection, wherein the first application programming interface program is operable to monitor the focus of the operating system, and wherein the first application programming interface program is operable to restore the previous connection automatically in response to detecting that a current application program no longer has the focus.

5. The method of claim 1 wherein the first application programming interface program maintains state information about a previous connection, and wherein the first application programming interface program is operable to restore the previous connection automatically in response to detecting that a current application program has terminated.

6. In a first server computer system, a programming interface layer between a server application program and a communication protocol program for a communication connection that follows a communication protocol, wherein the communication protocol is a set of hardware and software standards regulating transfer of data, the programming interface layer for remotely causing a client computer system to switch communication connections of the client computer system, the programming interface layer comprising:

a remote connection function for receiving a connectivity address from a first server application program of the first server computer system, wherein the connectivity address relates to a future communication connection of the client computer system, the future communication connection for communication between a client application program of the client computer system and a second server application program of a second server computer system; and code for sending a message including the connectivity address to the client computer system over a current communication connection between the client computer system and the first server computer system, the current communication connection following a first communication protocol, wherein the connectivity address supplies the client computer system with information to establish the future communication connection automatically, the future communication connection to follow a second communication protocol that is different than the first communication protocol.

7. The programming interface layer of claim 6 wherein a call to the remote connection function includes plural parameters, the parameters comprising:

a first pointer to an identifier relating to the second communication protocol;

a second pointer to address data for the communication between the client application program and the second server application program; and size data for the address data.

8. A method for remotely causing a client computer to switch communication connections of the client computer, wherein a communication connection follows a communication protocol that is a set of hardware and software standards regulating transfer of data, the method comprising:

in a first remote computer, creating a message for a first server application of the first remote computer, wherein the message relates to restoration of a prior communication connection of the client computer, the prior communication connection for prior communication between a client application of the client computer and a second server application of a second remote computer; and sending the message to the client computer over a current communication connection between the client computer and the first remote computer, the current communication connection following a first communication protocol, wherein the message indicates to the client computer to restore the prior communication connection based upon prior communication connection information stored by the client computer, the prior communication connection information supplying the client computer with information to restore the prior communication connection without prompting a user for additional information, the prior communication connection to follow a second communication protocol that is different than the first coummncation protocol.

9. The method of claim 8 wherein the first server application is a game server application, the client application is a game client application, and the second server application is a lobby server application.

10. In a first server computer system, a programming interface layer between a server application program and a communication protocol program for a communication connection that follows a communication protocol, wherein the communication protocol is a set of hardware and software standards regulating transfer of data, the proramming interface layer for remotely causing a client computer system to switch communication connections of the client computer system, the programming interface layer comprising:

a restore connection function for responding to a call from a first server application program of the first server computer system by creating a message, wherein the message relates to restoration of a prior communication connection of the client computer system, the prior communication connection for prior communication between a client application program of the client computer system and a second server application program of a second server computer system; and code for sending the message to the client computer system over a current communication connection between the client computer system and the first server computer system, the current communication connection following a first communication protocol, wherein the message indicates to the client computer system to restore the prior communication connection based upon prior communication connection information stored by the client computer system, the prior communication connection information supplying the client computer system with information to restore the prior communication connection automatically, the prior communication connection to follow a second communication protocol that is different than the first communication protocol.

11. The programming interface layer of claim 10 wherein the prior communication connection information comprises:

an identifier relating to the second communication protocol; and address data for the prior communication between the client application program and the second server application program.

12. In a computer system, a programming interface layer between an application program and a communication protocol program, the programming interface layer including functions for use by any of plural different application programs, wherein the programming interface layer coordinates switching of communication connections that follow any of plural different communication protocols, the programming interface layer comprising:

a receive function for retrieving an incoming message from a message queue;

a send function for sending an outgoing message; and code operable to switch from a first communication connection to a second communication connection in response to retrieval of a first message that includes a connectivity address, the first communication connection following a first communication protocol, the second communication connection to follow a second communication protocol that is different than the first communication protocol, wherein the connectivity address supplies a computer system with information about the second communication connection so as to facilitate automatic switching to the second communication connection.

13. The computer readable medium of claim 12 wherein the programming interface layer further comprises:

code operable to store first communication connection information; and code operable to restore the first communication connection based upon the stored first communication connection information in response to retrieval of a second message.

* * * * *

UNITED STATES PATENT AND TRADEMARK OFFICE
CERTIFICATE OF CORRECTION

PATENT NO. : 6,463,078 B1  Page 1 of 1
DATED : October 8, 2002
INVENTOR(S) : Engstrom et al.

It is certified that error appears in the above-identified patent and that said Letters Patent is hereby corrected as shown below:

Column 1,
Line 5, insert -- A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --

Signed and Sealed this

Twenty-fifth Day of February, 2003

JAMES E. ROGAN
*Director of the United States Patent and Trademark Office*